United States Patent
Pourboghrat et al.

(10) Patent No.: US 6,631,630 B1
(45) Date of Patent: Oct. 14, 2003

(54) HYDROFORMING OF COMPOSITE MATERIALS

(75) Inventors: Farhang Pourboghrat, Okemos, MI (US); Michael A. Zampaloni, Marshall, MI (US); Andre Benard, Haslett, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 413 days.

(21) Appl. No.: 09/668,506

(22) Filed: Sep. 22, 2000

(51) Int. Cl.[7] .................. B21D 22/10; B21D 26/02; B21D 39/08
(52) U.S. Cl. ................. 72/60; 72/63; 29/421.1
(58) Field of Search ................. 72/55, 57, 60, 72/63; 29/421.1

(56) References Cited

U.S. PATENT DOCUMENTS

| | | | | |
|---|---|---|---|---|
| 3,208,255 A | * | 9/1965 | Burk | 72/57 |
| 3,430,471 A | * | 3/1969 | Larsson | 72/63 |
| 3,568,487 A | | 3/1971 | Riesener | |
| 3,596,485 A | | 8/1971 | Burk | |
| 3,962,895 A | * | 6/1976 | Rydell | 72/63 |
| 4,301,584 A | * | 11/1981 | Dillner et al. | 29/421.1 |
| 4,314,468 A | * | 2/1982 | Baril et al. | 72/57 |
| 4,409,809 A | * | 10/1983 | Buchanan | 29/421.1 |
| 4,472,955 A | * | 9/1984 | Nakamura et al. | 72/57 |
| 4,689,979 A | | 9/1987 | Otsuka et al. | |
| 5,055,143 A | * | 10/1991 | Runyan et al. | 72/60 |
| 5,157,969 A | | 10/1992 | Roper | |
| 5,271,142 A | | 12/1993 | Moore et al. | |
| 5,372,026 A | | 12/1994 | Roper | |
| 5,557,961 A | | 9/1996 | Ni et al. | |
| 5,927,120 A | | 7/1999 | Marando | |
| 6,067,831 A | | 5/2000 | Amborn et al. | |
| 6,182,486 B1 | * | 2/2001 | Chuang | 72/46 |

FOREIGN PATENT DOCUMENTS

| | | | |
|---|---|---|---|
| DE | 12 79 615 | 10/1968 | |
| DE | 15 52 070 A | 11/1969 | |
| DE | 198 45 186 | 4/2000 | |
| DE | 100 27079 A | 12/2001 | |
| JP | 226317 | * 10/1991 | 72/57 |
| SU | 15585535 | * 4/1990 | 72/57 |
| WO | WO 92 19398 | 11/1992 | |

OTHER PUBLICATIONS

Okine et al., J. Reinforced Plastics Compos. 8: 70 (1990).
Hsu et al., J. Manuf. Sci. and Eng. 118: 434–438 (1996).
Hsiao et al., J. Eng. Mater. Technol. 119: 314–318 (1997).
Hassani et al., Computers and Structures 69: 707–717 (1998).
Baida et al. Proc. Seventh Inter. Symp. on Plasticity and ... Jan. 5–13 Cancun, Mexico Khan (ed). pp. 293–296.
Yossifon et al., J. Eng. for Industry, 110: 146–152 (1988).
Lo et al., J. Materials Processing Technol. 37: 225–239 (1993).
Gelin et al (1994).

* cited by examiner

*Primary Examiner*—David B. Jones
(74) *Attorney, Agent, or Firm*—Ian C. McLeod

(57) ABSTRACT

The present invention provides an apparatus and a method which use hydroforming to shape complex structures from materials such as sheet metal or composites. In particular, an apparatus and a method for shaping complex structures using composites such as continuous-fiber or woven fiber composites with limited wrinkling or rupture of the composite during the shaping process.

78 Claims, 11 Drawing Sheets

HYDROFORMING OF COMPOSITE MATERIALS

CROSS-REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION (1) Field of the Invention

The present invention relates to an apparatus and a method which use hydroforming to shape complex structures from materials such as sheet metal or composites. In particular, an apparatus and a method for shaping complex structures using composites such as continuous-fiber or woven fiber composites with limited wrinkling or rupture of the composite during the shaping process.

(2) Description of Related Art

Numerous manufacturing processes have been proposed over the years to shape composite materials, ranging from injection molding to sheet stamping, and filament winding. When reinforcements are incorporated into the matrix, ready-to-mold sheets can be prepared, stored, and processed later. The raw material thus processed comes in many forms, e.g., prepregs and sheet molding compounds (SMG) (Schwartz in *Composite Materials: Processing, Fabrication and Applications.* Prentice Hall, Upper Saddle River, N.J. 1997). The matrix is typically a thermosetting polymer, but thermoplastic-based fabrics and unidirectional sheets are also available for further processing. Shaping operations with these raw materials can be performed with sheet forming, bag molding, match die molding, contact molding, or transfer molding (Schwartz, ibid.). All these processes have been studied fairly extensively and are currently used by industry to manufacture polymer reinforced products of varying quality.

Various attempts have also been made to apply sheet stamping techniques to composites due to its high success with metals. A difficulty in using composite materials in stamping, however, is the limited draping capability of the fabrics or sheets. Forming of straight, continuous-fiber or woven-fiber composites results in wrinkling of the fibers and distortions. Randomly oriented fibers have provided good formability but without the advantages of the highly directional properties often desired in composite parts. Formable sheets that consist of aligned, discontinuous fibers appear to have been used with more success than continuous fibers (Okine et al., J. Reinforced Plastics Compos. 8: 70 (1990)). There is nonetheless a current need for forming and shaping methods that can produce complex structures with wrinkling limited as much as possible.

Hydroforming is a method that has been used for forming metals. Hydroforming consists of using a pressurized fluid to maintain the metal blank in close contact with the punch or die. This results, when compared with drawing of metals, in formation of metal components that have greater dimensional stability, in greatly reduced wrinkling, and reduced tooling and manufacturing costs (Hsu et al., J. Manuf. Sci. and Eng. 118: 434–438 (1996)). The following U.S. Patents relate to methods for using hydroforming to manufacture metal components.

U.S. Pat. Nos. 5,157,969 and 5,372,026 to Roper discloses an apparatus and method for hydroforming sheet metal using a modified standard double action press. U.S. Pat. No. 5,557,961 to Ni et al. discloses a method for hydroforming a tubular structural member of generally polygonal, flat-walled cross-section in which the various walls in the final part do not have the same thickness. U.S. Pat. No. 5,927,120 to Marando disclose a hydroforming apparatus that can deform relatively large and thick-walled workpieces. U.S. Pat. No. 6,067,831 to Amborn et al. discloses a hydroforming process for forming a component from an elongate tubular blank comprised of a deformable metal.

Since hydroforming for shaping metals has been shown to have important advantages over other metal shaping processes such as reduced tooling costs, increased drawability, and formation of components with greater dimensional stability, these same advantages could be realized for the manufacture of shaped composites by hydroforming if a coherent numerical method were available for predicting the final component geometry and for optimization of the hydroforming process for making shaped composites.

SUMMARY OF THE INVENTION

The present invention provides a hydroforming apparatus for forming a blank, the apparatus capable of being used in a conventional punch press comprising a fluid chamber mountable to an upper shoe defining a cavity for providing pressurized fluid to the upper surface of the blank and having a downwardly facing blank mating surface; a blank support mountable to a lower shoe having an upwardly facing blank binding surface for holding the blank with an opening therein which defines a cavity wherein a punch reciprocally located therein is capable of traveling upward through the opening into the fluid chamber; and the fluid chamber and blank support being adapted to receive and clamp a flexible blank between the blank mating surface and the blank binding surface, and the fluid chamber includes a passageway means for transmitting pressurized fluid from a pressurized fluid means to the fluid chamber wherein the fluid contacts the blank and a release means for removing the fluid.

The present invention further provides a hydroforming apparatus for forming a blank, comprising a punch press comprising an upper shoe and a lower shoe with an opening therein which defines a cavity with a punch reciprocally located therein which is capable of traveling upward through the opening; a fluid chamber mounted on the upper shoe defining a cavity for providing pressurized fluid to the upper surface of the blank and having a downwardly facing blank mating surface; a blank support with an opening mounted on the lower shoe over the opening in the lower shoe and having an upwardly facing blank binding surface for holding the blank wherein the opening in the blank support enables the punch reciprocally located within the lower shoe to travel upward into the fluid chamber; and the fluid chamber and blank support being adapted to receive and clamp a flexible blank between the blank mating surface and the blank binding surface, and the fluid chamber includes a passageway means for transmitting pressurized fluid from a pressurized fluid means to the fluid chamber wherein the fluid contacts the blank and a release means for removing the fluid.

Further still, the present invention provides a hydroforming apparatus for forming a blank, the apparatus capable of being used in a conventional punch press comprising a fluid chamber mountable to a first shoe defining a cavity for providing pressurized fluid to an obverse surface of the blank and having a blank mating surface; a blank support mountable to a second shoe having blank binding surface for holding a reverse surface of the blank with an opening therein which defines a cavity wherein a punch reciprocally located therein is capable of traveling through the opening into the fluid chamber; and the fluid chamber and blank support being adapted to receive and clamp a flexible blank between the blank mating surface and the blank binding surface, and the fluid chamber includes a passageway means for transmitting pressurized fluid from a pressurized fluid means to the fluid chamber wherein the fluid contacts the blank and a release means for removing the fluid. Preferably, the upper shoe and the lower shoe are mounted in a punch press.

An further still, the present invention provides a hydroforming apparatus for forming a composite blank, the apparatus capable of being used in a conventional punch press comprising a fluid chamber mountable to a first shoe defining a cavity for providing pressurized fluid to an obverse surface of the blank and having a blank mating surface; a blank support mountable to a second shoe having a blank binding surface for holding a reverse surface of the blank with an opening therein which defines a cavity wherein a punch reciprocally located therein is capable of traveling through the opening into the fluid chamber; a recycle means to introduce heated or cooled fluid into the fluid chamber to cure the composite blank; and the fluid chamber and blank support being adapted to receive and clamp a flexible blank between the blank mating surface and the blank binding surface, and the fluid chamber includes a passageway means for transmitting pressurized fluid from a pressurized fluid means to the fluid chamber wherein the fluid contacts the blank and a release means for removing the fluid.

In a particular embodiments of the above apparatus, the punch is enclosed within a punch chamber which has an opening for the punch to travel into the fluid chamber, wherein the punch chamber includes a passageway means for transmitting pressurized fluid from a pressurized fluid means to the punch chamber wherein the fluid contacts the blank and a release means for removing the fluid.

It is preferable that the fluid be selected from the group comprising silicon-based oil, petroleum-based oil, or a plant-based oil and further that the pressurized fluid means comprises a pressurized reservoir wherein the pressurized fluid is provided to the passageway means and wherein the pressure of the fluid is controlled by a pressure regulator. In particular, wherein the pressure of the pressurized fluid is monitored by a pressure transducer. Preferably, wherein the pressure of the pressurized fluid is controlled by a computer.

In a preferred embodiment, there is further provided a heating means that heats fluid which is pressurized by the pressurized fluid means to a temperature between the glass transition temperature and melting temperature of the blank. Alternatively, or in addition to the above heating means, the present invention provides a heating means that heats the blank support to a temperature between the glass transition temperature and melting temperature of the blank.

In particular embodiments of the present invention, it is further provided that the apparatus comprise a membrane that is impervious to the pressurized fluid and which is positioned between the blank and the pressurized fluid to prevent the pressurized fluid from directly contacting the surface of the blank.

The present invention further provides a method for hydroforming a blank comprising (a) providing an apparatus mounted in a conventional press comprising a fluid chamber mounted on a first shoe defining a cavity for providing pressurized fluid to an obverse surface of the blank and having a blank mating surface; a blank support mounted to a second shoe having a blank binding surface for holding a verse surface of the blank with an opening therein which defines a cavity with a punch reciprocally located therein which is capable of traveling through the opening into the fluid chamber; and wherein the fluid chamber and blank support being adapted to receive and clamp a flexible blank between the blank mating surface and the blank binding surface, and the fluid chamber includes a passageway means for transmitting pressurized fluid from a pressurized fluid means to the fluid chamber wherein the fluid contacts the blank and a release means for removing the fluid; (b) positioning a blank on the blank support between the blank mating surface and the blank binding surface; (c) forming a seal between the blank and the fluid chamber and the punch cavity by moving the fluid chamber toward the punch chamber until the blank is firmly clamped between the blank mating surface and the blank binding surface; (d) providing a fluid to the fluid chamber under a pressure sufficient to conform the blank to the shape of the punch as the punch moves into the cavity of the fluid chamber; (e) moving the punch into the cavity of the fluid chamber to form the blank to the shape of the punch; (f) removing the fluid through the release means; (g) withdrawing the punch into the punch cavity; and (h) removing a formed blank from the apparatus. The pressurized fluid is at a pressure sufficient to conform the blank to the punch as the punch deforms the blank.

The present invention also provides a method for hydroforming a composite blank comprising (a) providing an apparatus mounted in a conventional press comprising a fluid chamber mounted on a first shoe defining a cavity for providing pressurized fluid to an obverse surface of the blank and having a blank mating surface; a blank support mounted to a second shoe having a blank binding surface for holding a verse surface of the blank with an opening therein which defines a cavity with a punch reciprocally located therein which is capable of traveling through the opening into the fluid chamber; and wherein the fluid chamber and blank support being adapted to receive and clamp a flexible blank between the blank mating surface and the blank binding surface, and the fluid chamber includes a passageway means for transmitting pressurized fluid from a pressurized fluid means to the fluid chamber wherein the fluid contacts the blank and a release means for removing the fluid; (b) positioning a blank on the blank support between the blank mating surface and the blank binding surface; (c) forming a seal between the blank and the fluid chamber and the punch cavity by moving the fluid chamber toward the punch chamber until the blank is firmly clamped between the blank mating surface and the blank binding surface; (d) providing a fluid to the fluid chamber under a pressure sufficient to conform the blank to the shape of the punch as the punch moves into the cavity of the fluid chamber; (e) moving the punch into the cavity of the fluid chamber to form the blank to the shape of the punch; (f) removing the fluid through the release means; (g) withdrawing the punch into the punch cavity; (h) providing heated or cooled fluid to the fluid chamber through a recycle means to cure the composite comprising the blank; and (i) removing a formed blank from the apparatus. The pressurized fluid is at a pressure sufficient to conform the blank to the punch as the punch deforms the blank.

In a preferred embodiment, the punch is enclosed within a punch chamber which has an opening for the punch to travel upwards into the fluid chamber, wherein the punch chamber includes a passageway means for transmitting pressurized fluid from a pressurized fluid means to the punch chamber wherein the fluid contacts the blank and a release means for removing the fluid and wherein the pressurized fluid pressure is at a pressure sufficient to maintain equal pressure on both sides of the blank during the blank forming. In either embodiment, it is preferable that the pressurized fluid means comprise a pressurized reservoir wherein the pressurized fluid is provided to the passageway means and wherein the pressure of the fluid is controlled by a pressure regulator. It is further preferable that the pressure of the pressurized fluid be monitored by a pressure transducer and that the pressure of the pressurized fluid be controlled by a computer. It is also preferable that the fluid is selected from the group consisting of silicon-based oil, petroleum-based oil, or a plant-based oil and that the pressurized fluid be provided at a temperature between the glass transition temperature and the melting temperature of the blank.

In particular embodiments of the present invention, a membrane, which is impervious to the pressurized fluid, is positioned between the blank and the pressurized fluid to prevent the pressurized fluid from directly contacting the surface of the blank.

During the forming of the blank the fluid pressure can be maintained at a constant pressure or the fluid pressure is varied over time. In particular embodiments, the blank is heated to a temperature between its glass transition temperature and its melting temperature. In a preferred embodiment, an infra-red heater is used to heat the blank. In particular embodiments, the blank support is heated to a temperature between the glass transition temperature and melting temperature of the blank.

The method of the present invention is useful for hydroforming blanks which comprise a metal or a composite and is particularly useful for hydroforming composite blanks which are brittle at or below room temperature.

OBJECTS

It is an object of the present invention to provide an apparatus for hydroforming. In particular, an apparatus to shape complex structures using composites such as continuous-fiber or woven fiber composites with limited wrinkling or rupture of the composite during the shaping process.

It is further an object of the present invention to provide a method for hydroforming. In particular, a method to shape complex structures using composites such as continuous-fiber or woven fiber composites with limited wrinkling or rupture of the composite during the shaping process.

These and other objects of the present invention will become increasingly apparent with reference to the following drawings and preferred embodiments.

DETAILED DESCRIPTION OF THE INVENTION

All patents, patent applications, and literature references cited in this specification are hereby incorporated herein by reference in their entirety. In case of conflict, the present description, including definitions, will control.

To promote a proper understanding of the present invention, the following terms as they are used herein are hereby defined. The term "kPa" refers to kilo-Pascal which is the SI unit of measure for pressure or stress. 1 kPa is equivalent to 1 PSIG×6895.757/$10^3$. The term "blank" refers to any material that is the workpiece for the present invention. Thus, "blank" includes, but is not limited to, die blanks which generally are blanks that have been pre-cut to an appropriate size and each separately fed into the hydroforming apparatus to produce the shaped part and continuous sheets which are continuously fed into the hydroforming apparatus and from which multiple shaped parts are made. In general, die blanks are preferred for hydroforming. The blanks can comprise sheet metal or composite sheets, and the blanks can be planar or non-planar and of any configuration.

In hydroforming, a controllable pressurized fluid is used to offer a supporting force on the top (obverse) surface, bottom (reverse) surface, or both the obverse and reverse surfaces of a blank. Because a pressurized fluid is used, hydroforming is a process that is different from the conventional drawing process. The advantages of hydroforming are numerous and as a method for forming parts it is beginning to receive attention from the automotive industry partly because it is a less expensive process for manufacturing multipiece, stamped/welded assemblies in auto bodies and frames. Automotive companies are interested in reducing the average weight of their cars and trucks as a means for meeting federally mandated Corporate Average Fuel Efficiency (CAFE) standards. Auto body parts made with composite materials, instead of metal, can help them meet these CAFE standards.

However, the challenges are to make the composite parts inexpensively, without defects and without the need to extensively modify the existing stamping tools used for making metal parts. The hydroforming process eliminates the need for using a matching bottom die, and therefore, reduces the tooling costs that are associated with conventional methods for stamping parts. Other advantages of hydroforming include improved drawability of the blank due to the applied pressure by the fluid, low wear rate of dies and punch, and reduced thinning in the final product when compared to drawing. These same advantages apply to hydroforming composites. Thus, methods for hydroforming composites would enable auto manufacturers to fabricate composite parts with cost savings similar to those currently enjoyed by hydroforming parts from metal. Hydroforming composites would also result in similar cost savings for other manufacturers as well.

Figure 1A:
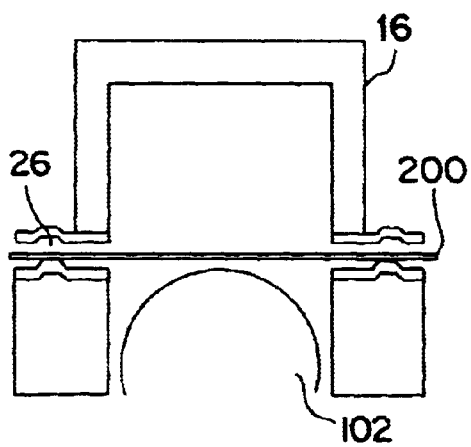
FIG. 1A shows a blank placed on the draw bead with the fluid chamber in the raised position.
Figure 1B:
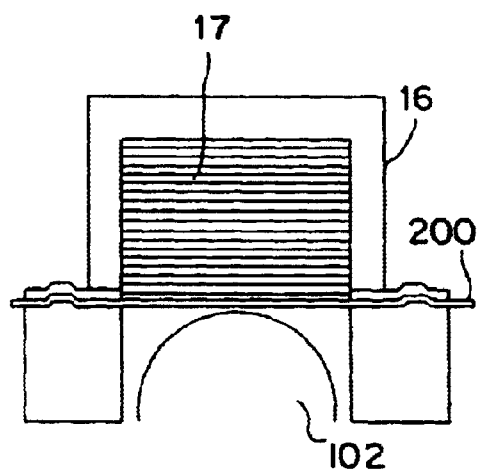
FIG. 1B shows the fluid chamber lowered and filled with heated fluid at an initial pressure. The blank is held in place by clamping mechanism.
Figure 1C:
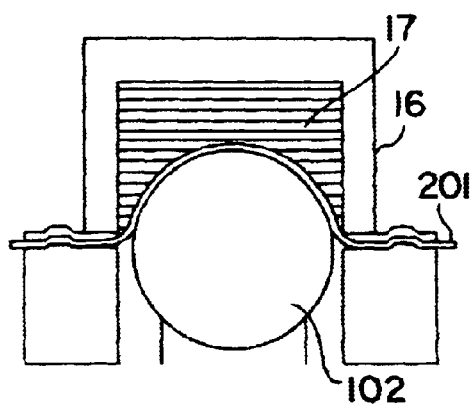
FIG. 1C shows the punch beginning to move upward, deforming the blank. Fluid pressure in the chamber is controlled to force the blank to conform to the shape of the punch.
Figure 1D:
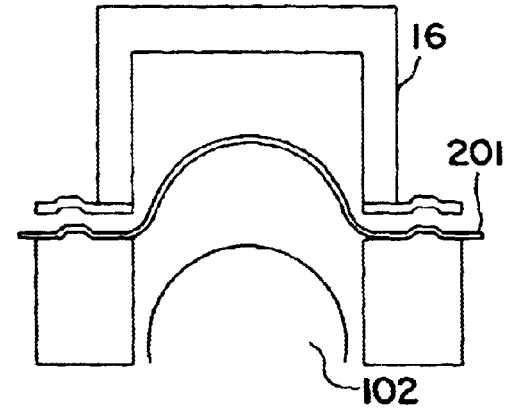
FIG. 1D shows the formed part after the fluid is drained, the fluid chamber raised, and the punch lowered.
Figure 2A:
FIG. 2A shows random discontinuous fiber architecture used in making composite materials which are suitable for hydroforming according to the present invention.
Figure 2B:
FIG. 2B shows oriented discontinuous fiber architecture used in making composite materials which are suitable for hydroforming according to the present invention.
Figure 2C:
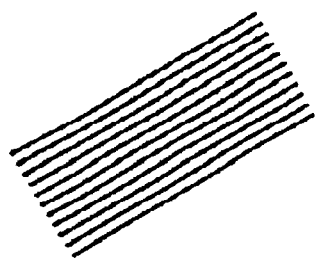
FIG. 2C shows oriented continuous fiber architecture used in making composite materials which are suitable for hydroforming according to the present invention.
Figure 2D:
FIG. 2D shows side view of woven fabric fiber architecture used in making composite materials which are suitable for hydroforming according to the present invention.
Figure 2E:
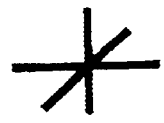
FIG. 2E shows orthogonal 3-D weave fiber architecture used in making composite materials which are suitable for hydroforming according to the present invention.
Figure 2F:
FIG. 2F shows braided structure fiber architecture used in making composite materials which are suitable for hydroforming according to the present invention.

FIGS. 1A to 1D illustrate the general hydroforming process for shaping a component from a blank using the hydroforming apparatus of the present invention adapted to a hemispherical die punch 102. In the open position (FIG. 1A), a blank 200 is placed on draw bead 26. In the closed position, pressurized fluid 17 is introduced into the fluid chamber 16 (FIG. 1B). Preferably, when blank 200 comprises a composite the pressurized fluid is at a temperature between the glass transition temperature and melting temperature of the composite. As the punch 102 travels into blank 200, the blank begins to deform into a hemispherical shape initially, and finally deforms into a fully formed part 201 after punch 102 penetrates deeper into the blank (FIG. 1C). While the punch is deforming the blank, pressurized fluid 17 in the fluid chamber is at a pressure sufficient to bend the blank through a sharp radius as the punch travels into the blank. A careful balance between the applied pressure, the temperature of the pressurized fluid, and the punch stroke is maintained for successful hydroforming. The temperature of the blank is directly tied to its ductility, especially if thermoplastics are used. FIG. 1D shows formed part 201 after draining the pressurized fluid from the fluid chamber, withdrawing punch 102, and opening the apparatus.

In hydroforming of blanks comprising sheet metals, the difficulty lies in finding an appropriate pressure-punch stroke path which avoids rupture of the blank and wrinkling instabilities. This difficulty is also a concern when hydroforming blanks comprising composites. However, as shown with metal blanks, the application of a hydrostatic pressure by the fluid significantly reduces wrinkling in the composite blank and improves the drawability of the composite. The process of hydroforming, unlike conventional stamping, generally involves supporting the bottom of the blank with a bed of viscous fluid, foam, or soft rubber, during the stamping process. This external support provides a through-thickness compressive stress that improves the formability of the blank by delaying the tensile instability (i.e., necking). Also, this external support reduces the formation of wrinkles caused by tensile frictional forces.

When hydroforming is applied to blanks comprising composites, the hydroforming process must be modified due to the inherent differences between polymers and metals, in particular, composites which are brittle at or below room temperature. Heat must be used in order to allow the onset of the cure process if thermosets are employed, or to reduce the stiffness or brittleness of the thermoplastic matrix by increasing its temperature to a processing temperature which is between the glass transition temperature and the melting temperature, i.e., $T_{glass} < T_{processing} < T_{melt}$. Unlike hydroforming metal blanks, hydroforming composite blanks requires a pressurized fluid temperature greater than room temperature, preferably a temperature from between about 250° to 300° C. to change the property of the composites sufficiently to enable the composite to be shaped. But the actual processing temperature for a particular composite depends on the properties of the composite. Since a heated fluid is used to shape the blank, good reproducibility can be expected from hydroforming because of the high heat transfer coefficient of the fluid.

A significant problem in matched-die forming (stamping) of blanks comprising short fiber composites or stapled fiber composites is maintaining the blank in place by a blank holding means such as clamps. If the load needed to draw a blank is higher than the shear yield stress of the composite comprising the blank, the blank will slide from under the holding means (Hsiao et al., J. Eng. Mater. Technol. 119: 314–318 (1997)). Hydroforming of a metal blank, however, requires significantly less force, if the blank is to be clamped at all, as the hydrostatic pressure is often sufficient to hold the blank in place. However, this last problem is often significant with blanks comprising composites as the polymer matrix can yield easily in the clamped region.

FIGS. 2A through 2F show particular fiber architectures that are suitable for composites comprising blanks for the hydroforming process of the present invention. The oriented continuous and oriented discontinuous fiber composites can withstand significant loading in tension before instabilities arise. This is due to the fiber arrangement within the matrix. The oriented fibers are strained along their total length so they can sustain a larger amount of strain. The woven fabrics and the random discontinuous fiber composites do not exhibit the same tension loading characteristics. In addition, a shearing action occurs between the fibers when these types of materials are stretched during the manufacturing process due to their orientation. Therefore, when utilizing these latter two fiber arrangements, the blank holding pressure needs to be increased slightly.

Hydroforming of composite materials has distinct advantages when compared to other manufacturing processes for shaping composites. For example, in hydroforming no bottom die is needed, which substantially reduces manufacturing costs, the hydrostatic pressure enhances dimensional stability and reduces wrinkling and rupturing tendencies, complex structural parts can be manufactured by hydroforming (e.g., tubes with complex cross-sections), increased drawability of the composite material because of the presence of hydrostatic pressure, reduced residual stresses upon unloading and cooling, better control over the thickness of the part to be formed, and reduced problems of blank holding of discontinuous fiber composites. However, because pressure-punch stroke path and temperature must be carefully controlled for each part formed, hydroforming composite blanks into formed parts is suitable for manufacturing parts at a medium production rate.

Figure 3:
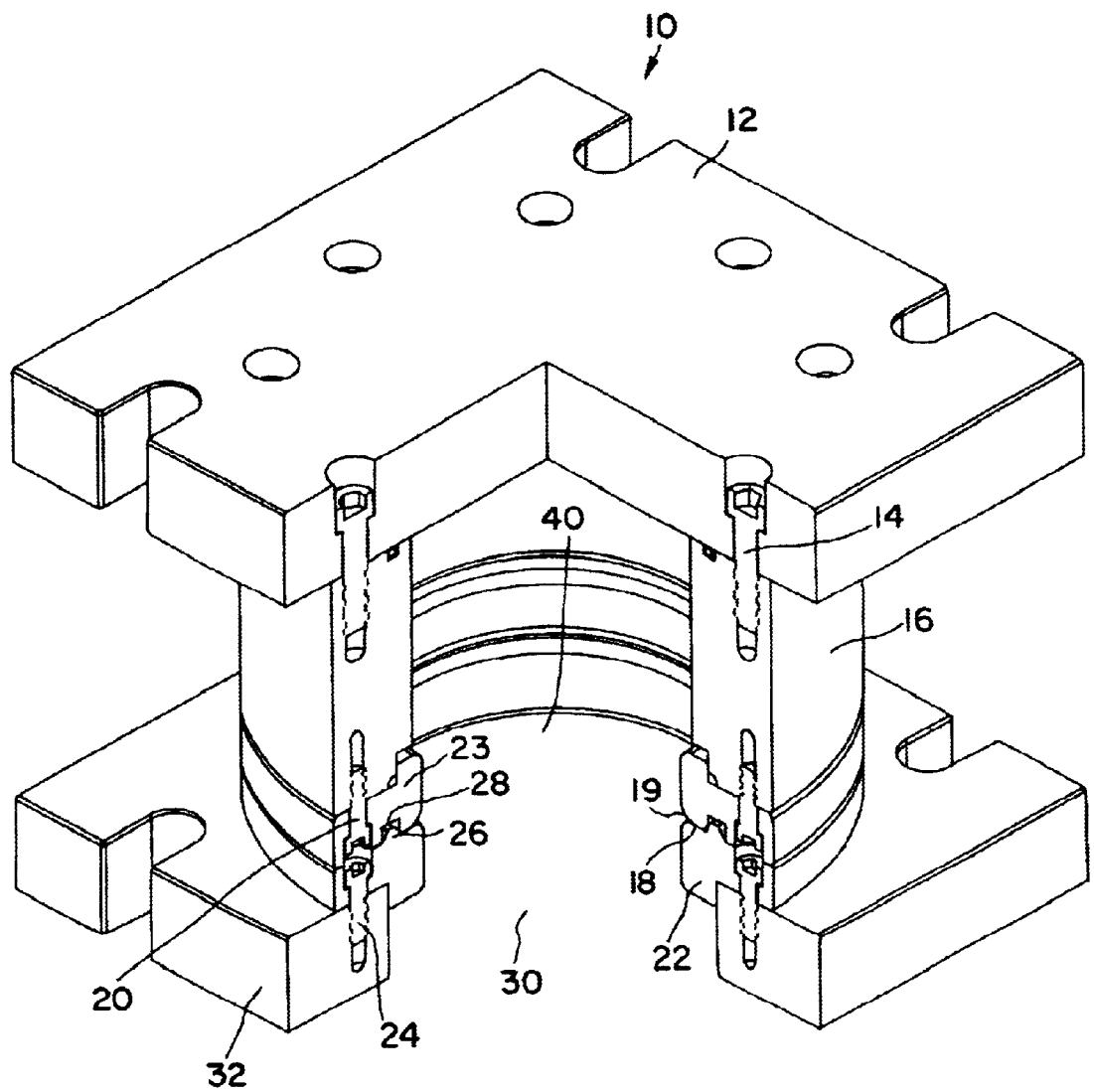
FIG. 3 is perspective view of the die components of the hydroforming apparatus of the present invention.
Figure 4:
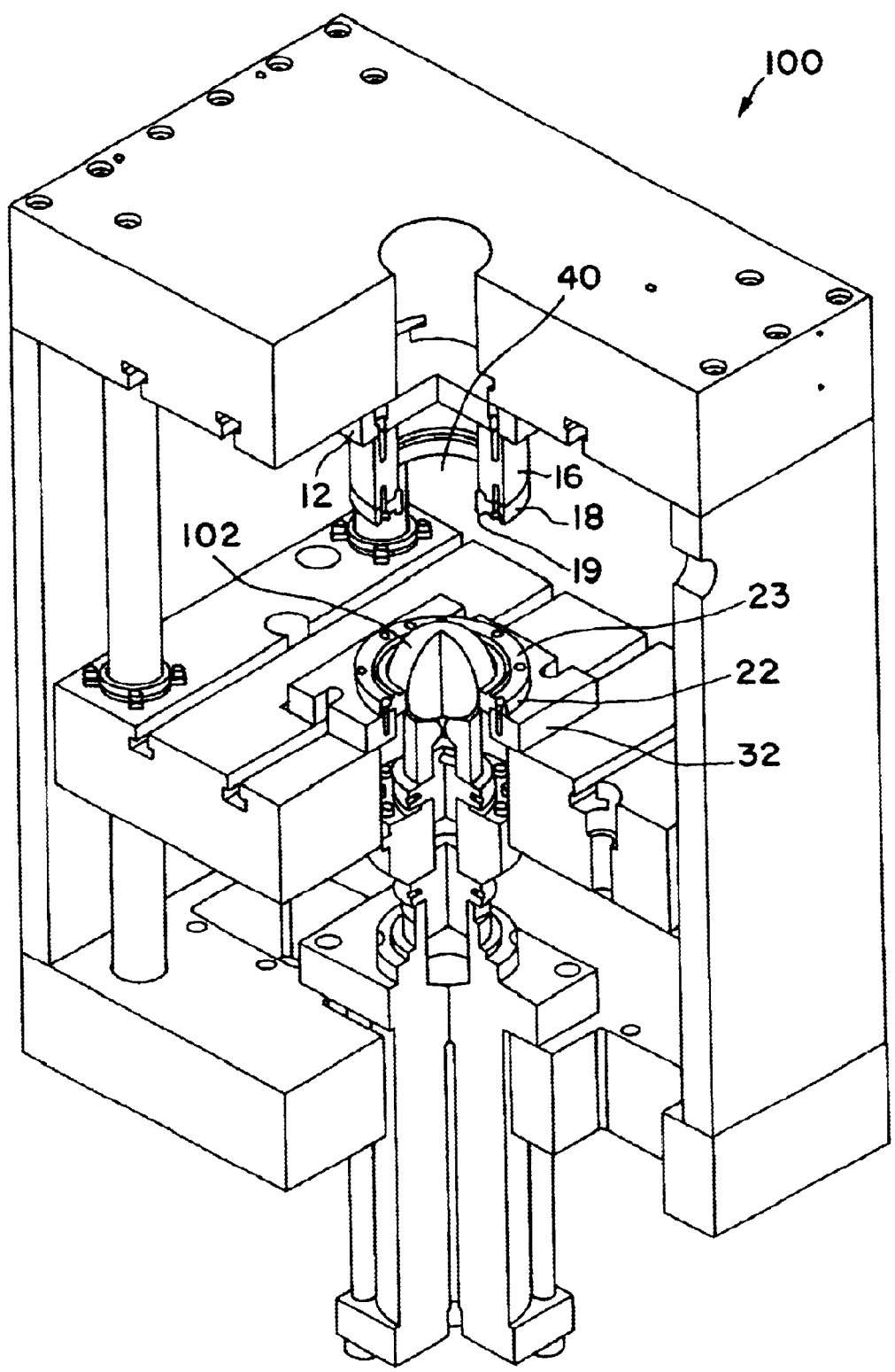
FIG. 4 is a perspective view of the die components of the hydroforming apparatus of the present invention adapted to a punch press.

FIG. 3 shows apparatus 10 of the present invention for producing shaped parts by hydroforming and FIG. 4 shows the apparatus 10 mounted on a punch press 100. While apparatus 10 is useful for hydroforming hemispherical cups, apparatus 10 is not to be construed to be limited to forming hemispherical cups. Thus, the present invention includes embodiments not illustrated in the figures such as configurations for forming non-hemispherical or angular shapes or complex shapes. Apparatus 10 comprises an upper shoe 12 with fluid chamber 16 mounted thereon using screws 14. Fluid chamber 16, which is open at its downwardly facing end, defines a cavity 40 which is for providing pressurized fluid to the upper surface of a blank (not shown). A blank support adapter 18 comprising a downwardly facing blank mating surface 19 (FIG. 4) is mounted to the downward facing end of fluid chamber 16 using screws 20. Apparatus 10 further comprises a lower shoe 32 with opening therein defining punch chamber cavity 30, which conforms to the opening of fluid chamber 16, and further comprising a blank support 22 defining the same configuration as opening 30 with an upwardly facing blank binding surface 23 (FIG. 4) mounted on lower shoe 32 using screws 24. Optionally, blank binding surface 23 can comprise a draw bead 26 and corresponding draw bead cavity 28. As shown in FIG. 4, apparatus 10 defines cavity 40 and punch chamber 30 wherein punch 102 provided by punch press 100 is reciprocally located therein.

Figure 5:
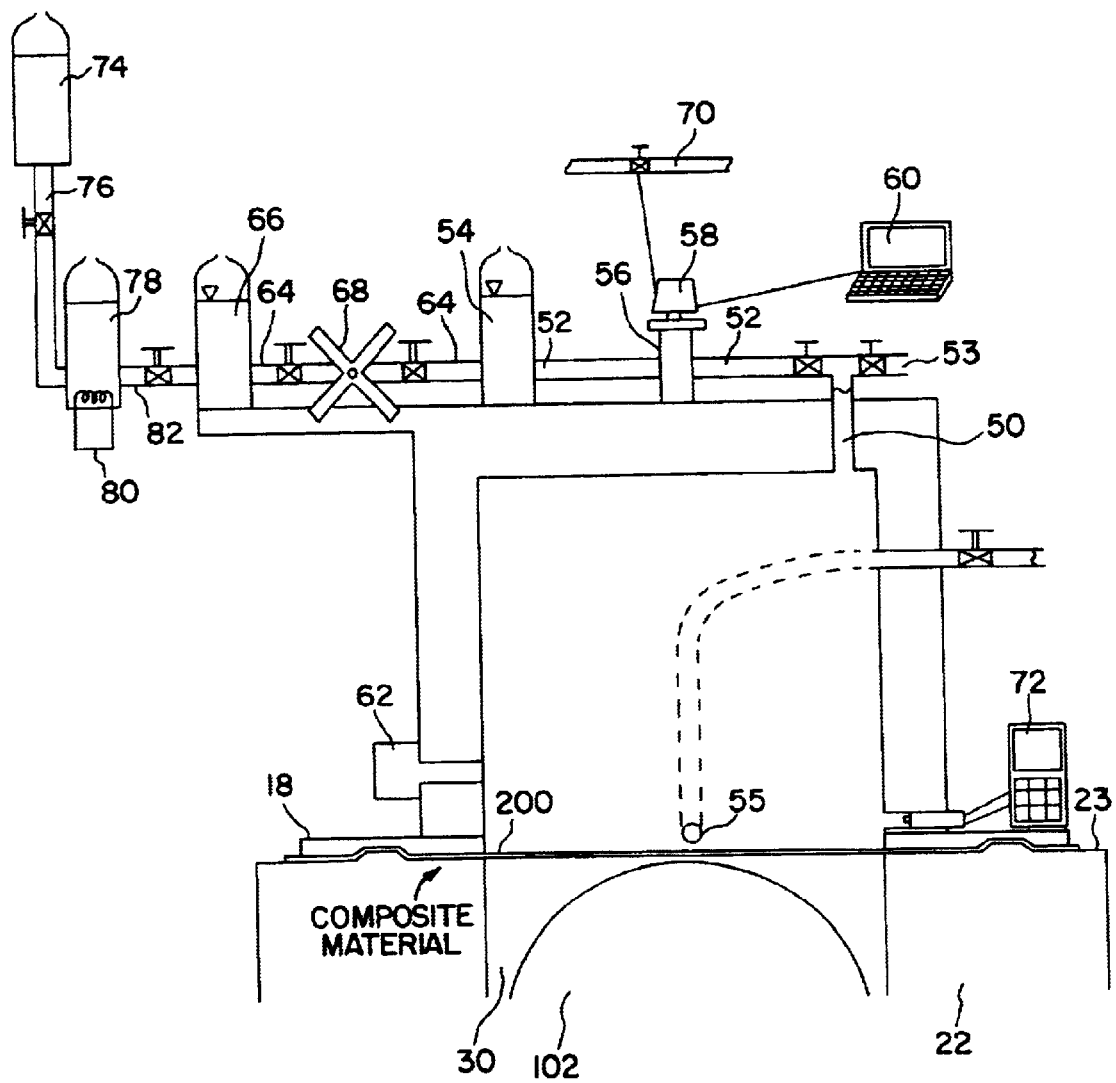
FIG. 5 is a front view of the hydroforming apparatus of the present invention adapted to a punch press and showing particular operational elements of the apparatus.

FIG. 5 is a schematic diagram showing apparatus 100, in the closed position and showing particular operational elements of the present invention. Apparatus 100 comprises a punch press with apparatus 10 mounted therein. FIG. 5 shows a blank 200, which is clamped between blank mating surface 19 of blank support adapter 18 and blank binding surface 23 of blank support by bringing the two parts together. The clamping is at a pressure sufficient to form a seal that prevents pressurized fluid from leaking from cavity 40. The figure further shows optional draw bead 26 and corresponding draw bead cavity 28. Also, shown located in punch chamber 30 and below blank 200 is punch 102. Pressurized fluid is provided to cavity 40 at inlet 50 and removed at outlet 52. Pressurized fluid is provided to inlet 50 through pressurized fluid line 52 which provides pressurized fluid from pressurized reservoir 54. Pressurized fluid line 53 further includes an air escape valve 53 which enables air to be bled from pressurized fluid line 52 and/or cavity 40. Located on pressure line 52 is pressure regulator 56 which is controlled by controller 58. Pressure regulator 56 enables the pressurized fluid to be maintained at a constant pressure during the hydroforming process or to allow the fluid pressure to be varied during the hydroforming process. In a preferred embodiment, controller 56 is operatively connected to a computer processing unit 60 which further monitors the fluid pressure in cavity 40 by pressure transducer 62. Thus, the pressure of the pressurized fluid can be monitored and regulated during the hydroforming process by a computer program which has been designed for hydroforming blank 200 of a particular material into a particular shape. Pressurized fluid is provided to pressurized reservoir 54 from open air reservoir 66 through fluid line 64. As the fluid is transferred to pressurized reservoir 54 its pressure is increased to an appropriate pressure by pressure intensifier 68 which can optionally be operably connected to computer processing unit 60. Further provided is air line 70 which runs controller 58. Air line 70 is used as part of controller 58. It comprises a bladder that inflates or deflates to purge or pull, respectively, the regulator fluid (not shown). Another air line (not shown) can be used to provide pressurized air to cavity 40 after blank 200 has been formed to flush the pressurized fluid from cavity 40 through outlet 55. The inlet for the pressurized air is not shown. The fluid flushed from cavity 40 is returned to open air reservoir 66, fluid storage reservoir 74, or heated fluid reservoir 78 by a return line (not shown). The apparatus can further include a recycle means (not shown) for introducing and then removing heated or cooled fluid from cavity 40 to cure the formed part when blank 200 comprises a composite. In particular, heated fluid is needed to cure composites comprising thermosets and cooled fluid is needed to cure composites comprising thermoplastics. The temperature of the fluid needed to effect curing depends on the cure properties of the composite, however, temperatures within the range between about 120° C. and the processing temperature of the composite are clearly within the scope of the present invention. The time duration the formed part is exposed to the heated or cooled fluid and the temperature of the heated or cooled fluid is at a temperature suitable for curing the composite.

In a preferred embodiment, the pressurized fluid is heated an appropriate processing temperature which is between the glass transition temperature and the melting temperature of the material comprising blank 200. For example, as shown in FIG. 5, the fluid, which is stored in fluid storage reservoir 74, is transferred by fluid line 76 to heated fluid reservoir 78 wherein the fluid is heated to an appropriate temperature using heating element 80. Heating element 80 includes, but is not limited to, such heating means as an electrical heater, heat-exchanger, hot-air heater, hot-water heater, steam heater, infra-red heater, gas heater, or a microwave heater. To compensate for temperature loss during transfer of the heated fluid to fluid chamber 16, the heated fluid can be heated to a temperature greater than the working temperature such that when the fluid is in fluid chamber 16 it is at the appropriate temperature. The heated fluid is then transferred by heated fluid line 82 to open-air fluid reservoir 66. The transfer of fluid from fluid storage reservoir 74 to heated fluid reservoir 78 and from heated fluid reservoir 78 to open air reservoir 66 is preferably achieved by using a pumping means (not shown). Alternatively, or in conjunction with the above, the heating can include heating to the appropriate temperature the pressurized fluid, fluid chamber 16, blank support 22, blank support adapter 18, punch 102, blank 200, or any combination thereof using any one of the aforementioned heating means. Optionally, the heating is controlled by computer processing unit 60 which monitors the temperature by thermocouple 72. Temperature monitoring can further include thermocouples at various positions between and including heated fluid reservoir 80 to fluid chamber 16 (not shown).

Furthermore, in certain cases the heated pressurized fluid will also effect curing of the composite comprising the formed part, particularly composites comprising thermosets. However, for other composites, such as those that comprise a thermoplastic, to effect curing after the part is formed, the part must be exposed to a fluid that has been cooled to a temperature below that which was used to form the part. The preferred means for accomplishing curing is to provide a recycle means, which includes a pumping means, for introducing into apparatus 100 a fluid which is at the appropriate temperature for curing the particular composite comprising the formed part. The recycle means (not shown) enables fluid for curing to be introduced into and subsequently removed from cavity 40 of fluid chamber 16. The fluid for curing is introduced into fluid chamber 16 after the pressurized fluid has been purged from chamber 16.

In an optional apparatus of the present invention, punch chamber 30 also has an inlet (not shown) for providing pressurized fluid from pressurized fluid line 52, an air escape valve (not shown), an outlet (not shown) for removing the fluid, and a return line (not shown) for returning the fluid to open air reservoir 66, fluid storage reservoir 74, or heated fluid reservoir 78. Further included is an inlet (not shown) for pressurized air to flush the fluid from punch chamber 30. The pressure of the fluid in punch chamber 30 is controlled by a regulator (not shown) and preferably a controller (not shown) which is operably connected to computer processing unit 60. Optionally, the pressurized fluid, which is provided to punch chamber 30, can be heated to an appropriate processing temperature which is between the glass transition temperature and the melting temperature of the material comprising blank 200, usually the same temperature as the pressurized fluid in cavity 40. The pressurized fluid in cavity 30 is particularly useful for preventing sagging of the composite material comprising blank 200 during the hydroforming process, particularly when the material is at a temperature between its glass transition temperature and its melting temperature. Furthermore, the pressurized fluid in cavity 30, when at the appropriate temperature, can facilitate curing of composites comprising thermosets because heat is on both sides of the formed part.

To form a blank into a shaped part using the present invention, in the open position a blank 200 is placed on blank binding surface 23. Apparatus 10 is then closed such that the blank 200 is clamped between blank binding surface 23 and blank mating surface 18 at a pressure sufficient to form a seal which prevents the pressurized fluid from escaping during the deforming process. Next, pressurized fluid is introduced into the fluid chamber cavity 40 and air is released through the air escape 53. Regulator 56 and controller 58, which are controlled by computer processing unit 60, accurately control the fluid pressure within the fluid chamber 16 as blank 200 is formed. If the pressure is too high, based on a user-defined algorithm input into computer processing unit 60, then the pressure is reduced to the appropriate level. If the pressure is too low then regulator 56 pulls additional pressurized fluid from pressurized reservoir 54. Pressure intensifier 68 is used to supply the necessary volume and pressure to pressurized reservoir 54 prior to the start of the hydroforming process.

Figure 15:
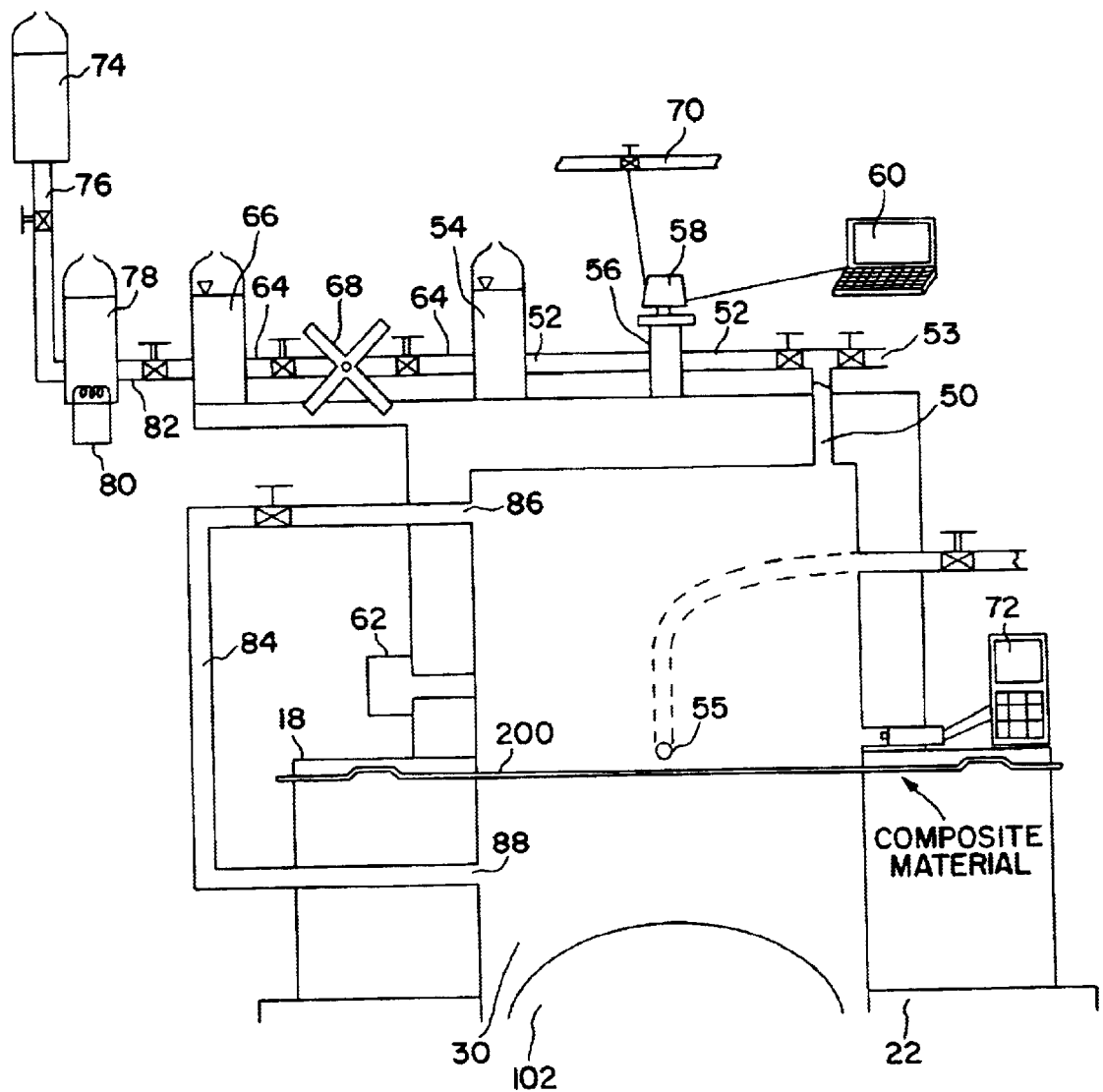
FIG. 15 is a front view of the hydroforming apparatus of the present invention adapted to a punch press showing the particular operational elements shown in FIG. 5 and further showing pressure equalization line 84 for equalizing the fluid pressure between cavities 40 and 30.

Optionally, in the case of a blank comprising a material that is brittle at room temperature or below, blank 200, blank support 22, blank support adapter 18, punch 102, and/or fluid are heated to an appropriate processing temperature that is between the glass transition and melting temperatures of the material comprising blank 200. A suitable means for heating blank 200 is by a conventional oven or an infrared oven. A heat gun or other heating means can be used to heat blank support 22, blank support adapter 18, and/or punch 102. While maintaining sufficient fluid pressure, punch 102 is moved into blank 200. As punch 102 deforms blank 200, the fluid pressure deforms blank 200 to the configuration of punch 102. In one embodiment of the present invention, the fluid is maintained at a constant pressure during the hydroforming process whereas in another embodiment of the present invention the fluid pressure is varied over time during the hydroforming process. In either embodiment, the pressure is controlled by a pressure regulator 56 and/or controller 58. After blank 200 has been formed to the appropriate shaped part, the fluid is flushed from the fluid chamber cavity 40 through outlet 55, apparatus 10 opened, and the shaped part removed. In an optional embodiment, pressurized fluid is also provided to punch chamber 30 during the hydroforming process to equalize the fluid pressure on both sides of blank 200. As shown in FIG. 15, pressure equalization line 84, which has outlet 86 and inlet 88 enables the fluid pressure to be equalized between cavity 40 and cavity 30. In an option further still, the fluid pressure on both sides of blank 200 is differentially maintained or varied during hydroforming, i.e., the fluid pressure in cavity 40 is maintained or varied at a fluid pressure during that is different from the fluid pressure that is maintained or varied during hydroforming in cavity 30. To provide the differentially maintained or varied fluid pressures, a portion of the fluid in open air reservoir 66 is pressurized and transferred to cavity 30 through a regulator controlled by a controller (not shown). Preferably, the controller is operatively connected to computer processing unit 60. In any one of the above options, it is preferable that the temperature of the fluid in both cavities be the same.

After the part is formed, it is desirable cure the composite comprising the formed part. For some types of composites, this can be achieved when the temperature of the pressurized fluid during the shaping is suitable for curing the composite, e.g., curing composites comprising a thermoset. For other composites that comprise materials such as thermosets, the pressurized fluid is removed from cavity 40 of fluid chamber 16 and a fluid heated to a temperature appropriate to effect curing of the composite is introduced into cavity 40. For composites that comprise materials such as thermoplastics, the fluid that is introduced into cavity 40 is cooled or chilled to the appropriate temperature to effect the curing. For any composite, the temperature of the fluid needed to effect curing depends on the cure properties of the composite, however, temperatures within the range between about −120° C. and the processing temperature of the composite are clearly within the scope of the present invention. Preferably, curing the formed part is accomplished by further including in apparatus 100 a recycle means (not shown), which includes pumping means, for introducing and then removing heated or cooled fluid from cavity 40 to cure the formed part. Both the time duration the formed part is exposed to the heated or cooled fluid and the temperature of the heated or cooled fluid is dependent on the composition of the composite. The fluid for curing can be pressurized. Optionally, apparatus 100 can further include a recycle means (not shown), for introducing and removing heated or cooled fluid to cavity 30. The fluid for curing introduced into cavity 30 can be at the same temperature as the fluid for curing introduced into cavity 40 or, when desirable, at a different temperature. Therefore, in the optional apparatus, fluid for curing can be introduced into cavities 40 and 30 simultaneously or sequentially, into cavity 40 only, or into cavity 30 only.

The pressurized fluid for hydroforming preferably comprises an oil or other liquid that does not chemically react with the material comprising the blank. Furthermore, it is preferable that the fluid have a boiling temperature that is higher than the processing temperature of the composite material comprising the blank. Examples of suitable fluids include, but are not limited to, vegetable oils, petroleum-based oils, silicon-based oils, or other synthetic oils. For blanks made from particular materials, water or particular aqueous solutions can be an appropriate fluid. The fluid for curing is preferably an oil or other liquid that does not chemically react with the material comprising the blank. Furthermore, it is preferable that the fluid be freely flowing at the curing temperature. Examples of suitable fluids include, but are not limited to, vegetable oils, petroleum-based oils, silicon-based oils, other synthetic oils, water, or aqueous solutions.

In particular embodiments of the present invention, it is desirable that the pressurized fluid not be allowed to contact blank 200. Particularly, when the material comprising blank 200 is not compatible with the pressurized fluid or is porous. Therefore, prior to closing the apparatus, blank 200 is covered with a flexible membrane which is impervious to the pressurized fluid. The membrane conforms to the surface of blank 200 and prevents the pressurized fluid from contacting blank 200. The flexible membrane allows the pressurized fluid to maintain contact with the inner surfaces of the fluid chamber, which is important for accurately monitoring the fluid pressure and/or temperature.

Alternatively, a flexible bladder made from a material that is impervious to the pressurized fluid is positioned within the fluid chamber cavity and the pressurized fluid introduced into the bladder. The pressurized fluid causes the bladder to conform to the surface of blank 200 and to maintain contact with the surface of blank 200 as blank 200 is deformed by the punch 102. However, it is preferable that a bladder not be used because the bladder prevents the fluid from contacting the inner surfaces of the fluid chamber, which makes it difficult to accurately determine the fluid pressure and/or temperature. In the case of hydroforming metal blanks, it is preferable not to use a bladder.

In a further alternative that enables the fluid to maintain contact with the inner surfaces of the fluid chamber, a flexible diaphragm is fixed to the opening of the fluid chamber 16 or blank support adapter 18 such that when apparatus 10 is in the closed position, the diaphragm conforms to the surface of blank 200 when pressurized fluid is provided to the fluid chamber cavity 40 and maintains contact with the surface of blank 200 as it is being deformed. A flexible membrane or diaphragm can also be provided to prevent fluid from punch chamber 30 from contacting blank 200.

Numerical Analysis for Hydroforming of Composites

One of the most important steps in the development of a new shaped part is determining a numerical method for the prediction of final part geometry and for the optimization of the process to meet certain product specifications. When working with composite materials this becomes even more critical, since these types of materials are prone to wrinkling and buckling during the manufacturing process. In addition, when altering composite materials, anisotropy may be introduced to the part by the rearranging of the fibers within the matrix.

One very important tool that can be used to aid in the optimization process is finite element analysis (FEA). FEA can be used as a predictor of part geometry as changes are made to the fluid pressure, fluid pressure, part geometry, or a combination of all three. When dealing with composite materials the interaction between the fiber and matrix are very difficult to predict accurately so typically specific modeling codes need to be developed to account for these effects.

Before taking the rather large step of developing a specialized FEA code, it was imperative to study the process using existing commercial codes to determine the validity/invalidity of the programs as they apply to the hydroforming process. Commercially available FEA codes do provide some distinct advantages over specialized codes. They are relatively easy to use and they provide an efficient method for establishing baseline data for comparison purposes.

For hydroforming of hemispherical cups preliminary modeling has been performed using the commercial code MARC. The results of the preliminary MARC FEA analysis are described below.

Preliminary Numerical Analysis

Figure 6:
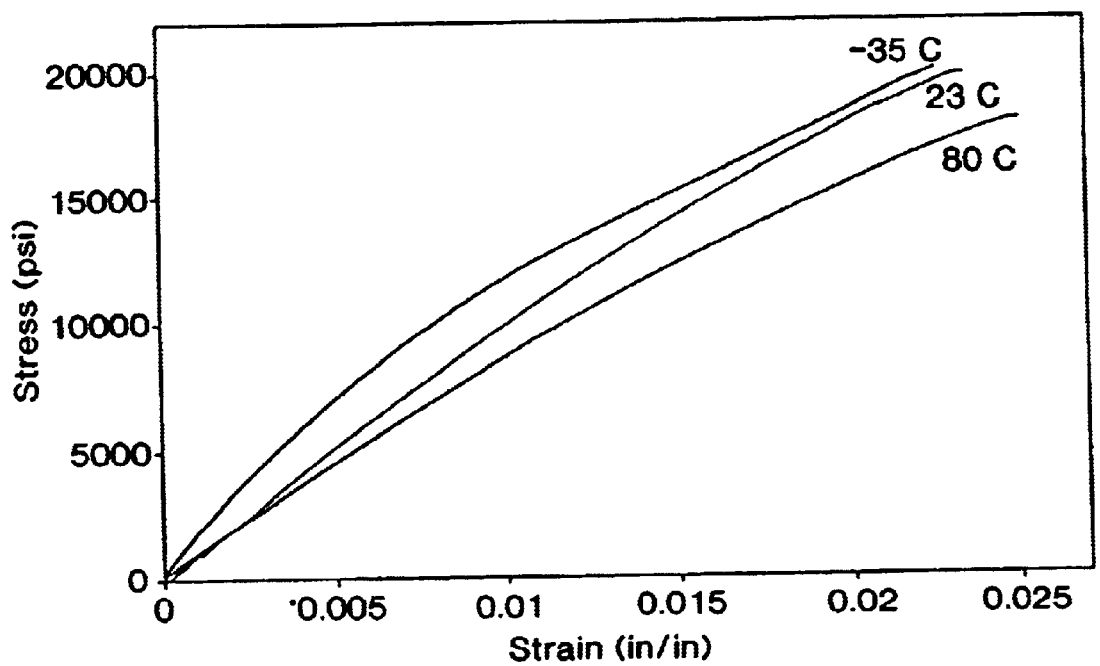
FIG. 6 shows a stress-strain plot for 40% continuous strand mat glass fiber reinforced polypropylene material.
Figure 7:
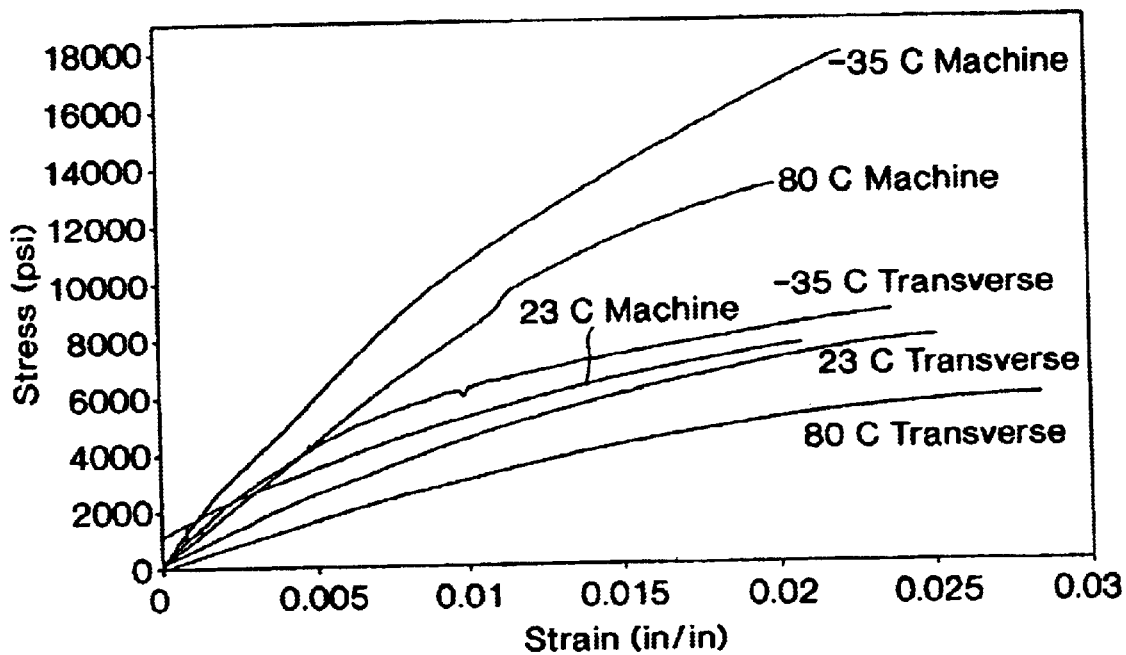
FIG. 7 shows a stress-strain plot for 32% oriented, long chopped fiber glass fiber reinforced polypropylene matrix material.
Figure 8:
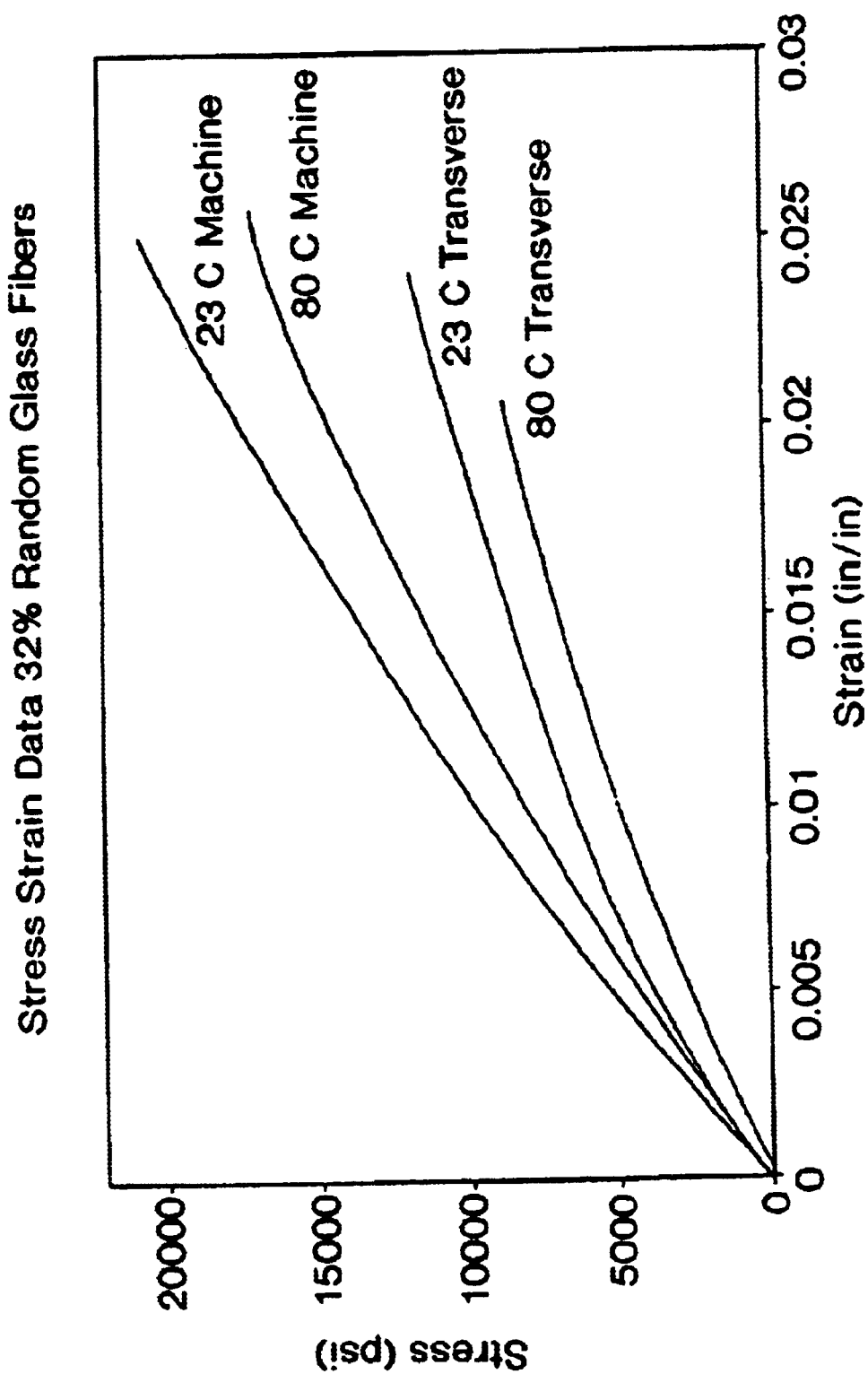
FIG. 8 shows a stress-strain plot for 32% random, long chopped glass fiber reinforced polypropylene matrix material.
Figure 9:
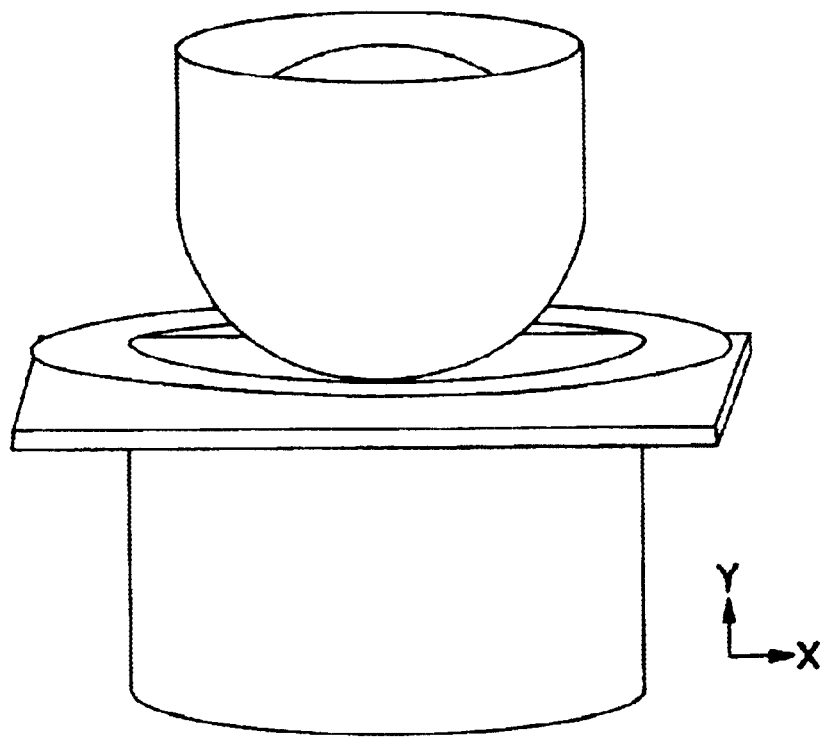
FIG. 9 shows a three-dimensional model of the hydroforming process created using MARC.

The first step toward creating a finite element model for hydroforming was to determine the material properties that were needed to represent composite sheets (blanks). Through a series of tensile tests the stress plots, at different temperatures, for different types of composite sheets were created. The composite material used for the tests were glass mat fiber reinforced polypropylene sheets provided by Azdel, Inc. (Shelby, N.C.). These stress plots for Azdel glass mat fiber reinforced polypropylene materials are shown in FIGS. 6 through 8. FIG. 6 is a stress plot for 40% continuous strand mat, polypropylene material, FIG. 7 is a stress plot for 32% oriented, long chopped fiber polypropylene matrix material, and FIG. 8 is a stress plot for 32% random, long chopped fiber polypropylene matrix material. These data were used as input into the model to provide baseline material properties for the MARC model. Using MENTAT, the graphical input program for MARC, a three-dimensional graphical model of this process was created (FIG. 9). Initially, the focus was placed on only modeling continuous fiber reinforced polypropylene matrix composite material blank formed into hemispherical cups. This allowed for some simplifying assumptions that eased the computational time and provided a general idea of whether the modeling procedure was valid. The first assumption used to simplify the model was to assume that the workpiece could be considered isotropic. Since the modeling is for a continuous fiber reinforced thermoplastic, this assumption is valid as long as the fibers are arranged properly during the manufacturing process.

The stresses in the z-direction (lateral) were assumed to be uniform, thereby allowing for the creation of a simpler, plane stress model. The final assumption that went into the modeling process was that the punch and die were treated as rigid and, therefore, not deforming during the process.

Using these assumptions and utilizing the material properties shown in FIGS. 6 through 8, a finite element model of the hydroforming of composite material process was created using MARC (FIG. 9). The hydroforming process was modeled using a rigid-plastic, incremental analysis that used large displacements and an updated Lagrangian procedure. The modeling was conducted for a blank that was drawn to a depth of approximately 63.5 mm while varying the fluid chamber cavity fluid pressures between 0 and 950 (6550 kPa) pounds per square inch (psi), in particular pressures of 0, 250 (1724 kPa), 500 (3448 kPa), 750 (5172 kPa), and 950 (6550 kPa) psi.

The boundary conditions utilized included restricting y-direction movement of the lower end of the axisymmetric part to account for the axis symmetry within the material. The second boundary condition placed on the system was the fluid pressure in the fluid chamber cavity. To stimulate this pressure, an edge load was placed on the surface. As the blank deformed, this edge load stayed normal to the surface at all points thereby giving a fair representation of the fluid in the fluid chamber cavity during the hydroforming operation.

Figure 10:
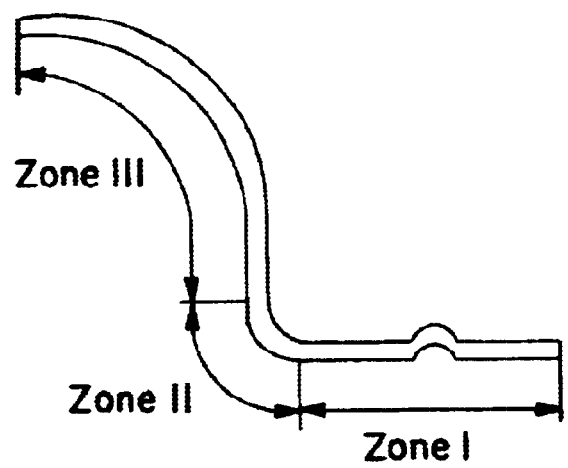
FIG. 10 is an illustration of formed blank (workpiece) regions.

Overall, the simplistic model showed fairly consistent results. In an attempt to better illustrate the observations made about the results it is important to establish a frame of reference. For this purpose, the final shaped part has been split into three distinct zones as illustrated in FIG. 10. Zone I represents the draw bead area of the hydroformed part, zone II is the area of the part that forms against the sidewall of the pressure cavity entrance, and zone III represents the dome of the hemispherical part being formed.

When increasing the fluid pressure in the fluid chamber cavity, the expected result was to be able to draw the blank to a deeper depth before failure. This was confirmed through the results of the simplistic model. With the pressure at 6550 kPa, the blank was drawn to a depth of 23.6 mm before failure. In the absence of fluid pressure the draw depth was only 15.9 mm before reaching failure. This represents a 49% increase in draw depth, which demonstrates the advantages in deep drawing using fluid pressure.

Figure 11:
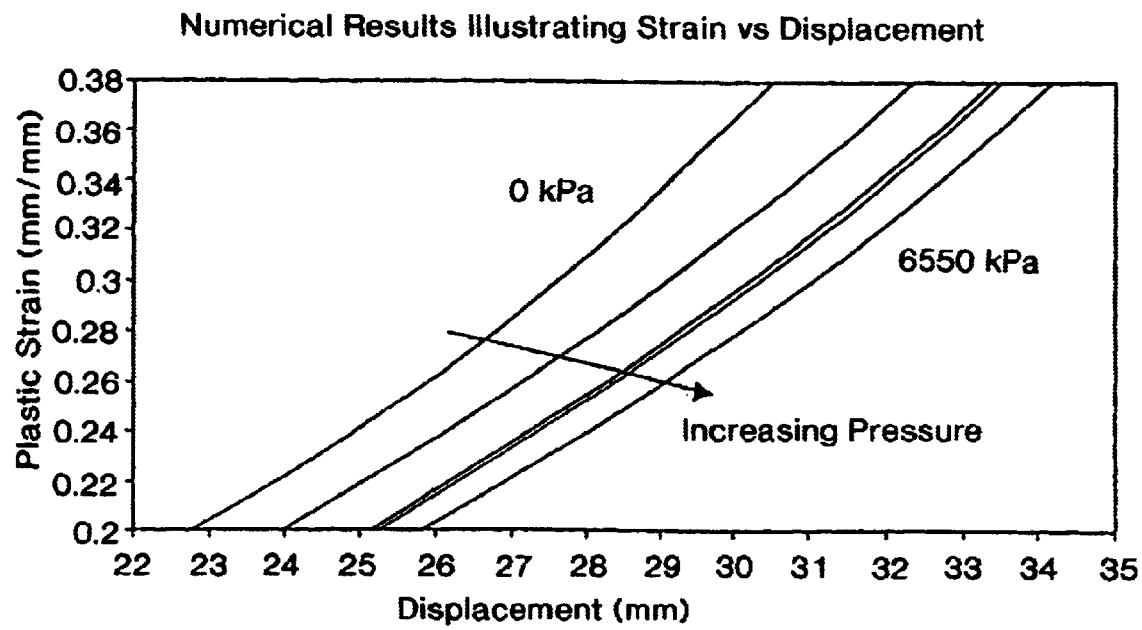
FIG. 11 shows plastic strain verses displacement for pressure ranges of 0, 1724, 3448, 5171, and 6550 kPa.

A more significant result can be found from a comparison of the overall total equivalent strain for the part. Results. indicated that as the pressure was increased, the strain decreased, especially in zone III. Typically, as the part is formed, some significant thinning of the material occurs in zone III, especially near the punch hole. This result was expected and provided a great reference point for determining the advantage of changing the fluid chamber cavity fluid pressure. The strains at this point of the material were analyzed and compared as the fluid chamber cavity pressure was varied. FIG. 11 graphically represents these changes showing just the strain region from 0.2 to 0.38 mm/mm. From this plot it is clear that the effective plastic strain decreases as the pressure is increased.

Quantitatively, with no fluid chamber cavity pressure and using a strain failure criterion of about 30% (0.3 mm/mm), the blank was drawn to a depth of 27.2 mm. When the fluid pressure in the fluid chamber cavity was raised to 6550 kPa, the draw depth, using the same strain failure criteria, was 31.2 mm. This represents a 14% increase in draw depth. The result illustrates that by adding this fluid pressure, the blank can be drawn to a deeper depth before strain failure occurs. More importantly, the strains at various locations within the blank were lower with the increased fluid pressure. This implies that the forming part may be drawing with more uniformity and that using a fluid pressure within the fluid chamber cavity could lead to the development of a more accurate and uniform part.

Figure 12:
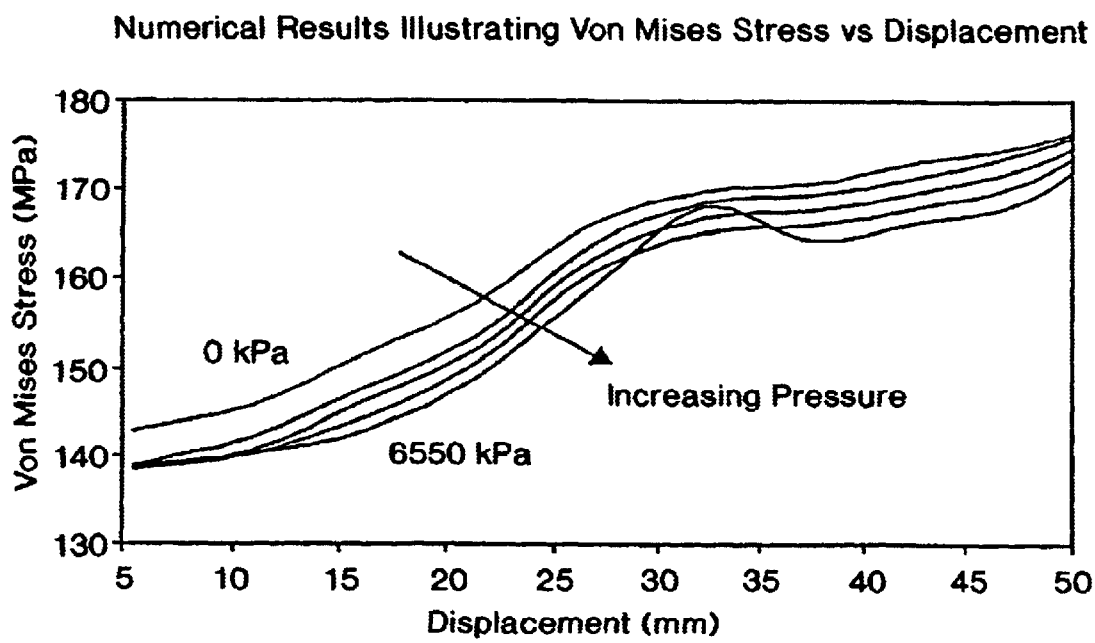
FIG. 12 shows numerical results of Von Mises stress verses displacement for pressures of 0, 1724, 3448, 5171, and 6550 kPa.

FIG. 12 shows the effect that fluid pressure variations have on the build up of stresses within the blank during the hydroforming process. At higher fluid pressures, the failure level was not reached until further into the draw. This is significant because it means that the fluid pressure allows for deeper draws before failure. Another advantage that was found when using the higher pressures was the ability of the pressure to force the blank material onto the punch. This allowed for better shaping of the final part in addition to aiding in the decrease of one of the high stress concentration areas typically found in these types of parts. Traditionally, a high stress concentration was found in zone II because of the contact between the blank material and the leading edge of the fluid chamber cavity. By utilizing the fluid pressure, the material in this area was forced to conform to the punch.

As expected, based on the nature of the thermoplastic composite material, an increase in temperature does have a profound effect on the stress levels within the material. Therefore, in order to optimize this part of the process, the temperature effects need to be incorporated into the model to create an accurate prediction method, which can be used to calculate the appropriate pressures needed to hydroform a composite blank depending on the composition of the composite and the configuration of the shape the composite is to be formed into.

To take into account the anisotropic properties typically associated with glass fiber reinforced polypropylene thermoplastic material, another FEA modeling analysis needs to be done. This requires additional material tests to determine the behavior of such composites in different directions. With such data, a phenomenological yield function is developed and incorporated into the finite element model to represent the through-thickness and planar anisotropy of the composite sheet during the hydroforming process. A correlation between this FEA analysis and experimental results indicates that there is no need to develop a specialized finite element code for manufacturing process using glass fiber reinforced composites. If the correlation is poor then the development of a specialized finite element code for the hydroforming of composite materials process is warranted. One such method would be an adaptation and expansion of the Homogenization method proposed by Hsiao et al., J. Eng. Mater. Technol. 119: 314–318 (1997).

Homogenization Method

Since composite microstructures are very complex, the homogenization method for composite materials simplifies the analysis. Homogenization consists in replacing a complicated model with a simpler, equivalent model. From a mathematical standpoint, homogenization is a limit theory that uses an asymptotic expansion, along with the assumption of periodicity, to substitute the differential equations with rapidly oscillating coefficients with differential equations whose coefficients are constant or are slowly varying in such a way that the solutions are close to the initial equations (Hassani et al., Computers and Structures 69: 707–717 (1998)).

Figure 13:
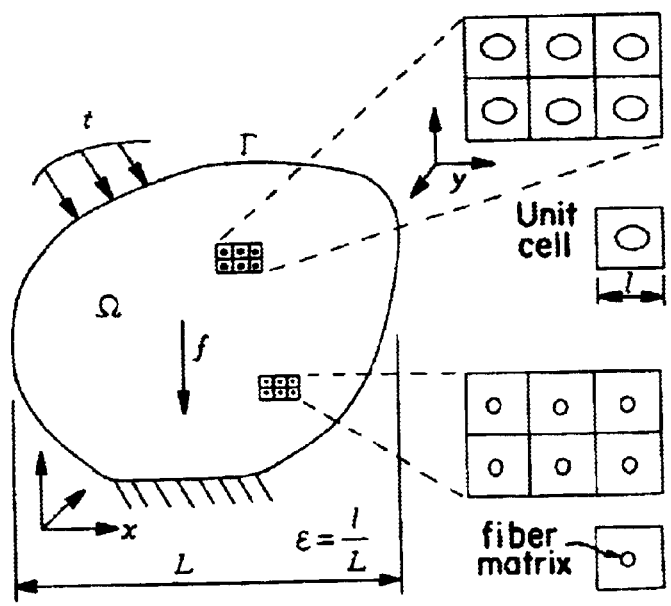
FIG. 13 shows global structure and unit cells of a periodic reinforced composite.

The use of the homogenization method makes it possible to predict both the overall and the local properties of processed composites. This is accomplished in two steps: (1) solve the appropriate local problem on the unit cell (microscopic level), and (2) use the solution in (1) to determine a boundary value for a homogenized material. FIG. 13 illustrates the global structure and unit cells of a periodic reinforced composite.

There are two distinct advantages to using the homogenization method: (1) the analysis of the unit cells at the microscopic level can be used to determine the material properties and macroscopic constitutive equations, and (2) the homogenization method allows for a localization procedure to be used in the evaluation of the microscopic filed of deformation mechanics.

Governing Equations and Finite Element Implementation

To use the homogenization method to model hydroforming of composite materials, the method is divided into two distinct stages: (1) thermoforming and (2) cooling. The governing equation for the thermoforming stage is derived from the balance of the external and internal energy of the structure (Hsiao et al., J. Eng. Mater. Technol. 119: 314–318 (1997)). Since the deep drawing process is not isothermal, the heat transfer between the cold tool and the heated sheet, as well as the viscous energy dissipated by the resins is accounted for with the aid of equation (1), the Governing Equation for Thermoforming Stage:

$$\rho c_p \frac{\partial T}{\partial t} = \frac{\partial}{\partial x_j}\left(k_{ij}\frac{\partial T}{\partial x_i}\right) + \dot{R} \quad (1)$$

wherein T is the temperature, $\rho$ is the density, $c_p$ is the specific heat, $K_{ij}$ is the conductivity tensor, and R is the heat generation rate (Hsiao et al., J. Eng. Mater. and Technol. 119: 314–318 (1997)).

The governing equation for the cooling stage of the deep drawing process was based on an elasticity analysis, which attempts to account for the springback of the material once the shaped blank is removed from the mold. This relationship is described in equation (2), Governing Equation for the Cooling Stage:

$$\frac{\partial}{\partial x_j}E_{ijkl}(\varepsilon_M - \varepsilon_{kl}^T) = 0 \quad (2)$$

wherein $E_{ijkl}$ is the elasticity tensor, $e_{kl}$ is the elastic strain and $e^t{}_{kl}$ is the thermal strain due to volume shrinkage.

The homogenization method was utilized to make these equations adaptable to the finite element analysis (FEA) environment by de-coupling the governing equations into a set of microscopic and macroscopic equations for both the thermoforming stage and the cooling stage. Equations (3) through (8) illustrate the de-coupling.

Microscopic Equations for the Thermoforming Stage consist of equation (3) for flow analysis and equation (4) for thermal analysis are:

$$\int_{Y_Y} \frac{\partial \chi_i^{kl}}{\partial y_j}\frac{\partial w_i}{\partial y_j} dY_f = \int_{Y_Y}\frac{\partial w_k}{\partial y_l} dY_f \quad (3)$$

$$\int_Y K_{ij}\frac{\partial \phi^k}{\partial y_i}\frac{\partial \tau}{\partial y_j} dY = \int_Y K_{ik}\frac{\partial \tau}{\partial y_i} dY \quad (4)$$

wherein Y is the unit cell domain with the subscript f denoting the fluid phase, w and τ T are virtual variations, X and φ are the characteristic responses in the microscale y, and K is the thermal conductivity tensor.

Macroscopic Equations for the Thermoforming Stage consist of equation (5) for flow analysis and equation (6) for thermal analysis are:

$$\int_\Omega \mu D_{ijkl}^H \dot{e}_{kl}\frac{\partial w_i}{\partial x_j} d\Omega = \int_\Omega f_i w_i d\Omega + \int_\Omega \frac{\partial P}{\partial x_i}w_i d\Omega + \int_\Gamma t_i w_i d\Gamma \quad (5)$$

$$\int_\Omega \rho c_p \frac{\partial T}{\partial t}\tau d\Omega + \int_\Omega K_{ij}^H \partial T \frac{\partial \tau}{\partial x_i \partial x_j} d\Omega - \int_\Omega \dot{R}\tau d\Omega = \int_\Omega \dot{q}_n d\Gamma \quad (6)$$

wherein $\dot{e}$ is the strain rate in the macroscale x, t, and $q_n$, are the traction and heat flux across the boundary Γ of the global domain Ω, and $D^H$ and $K^H$ are the homogenized flow tensor and conductivity tensor, respectively.

Microscopic Equation for the Cooling Stage is:

$$\int_Y E_{ijkl}\frac{\partial \Psi_k^{pq}}{\partial y_l}\frac{\partial v_i}{\partial y_j} dY = \int_Y E_{ijpq}\frac{\partial v_i}{\partial y_j} dY \quad (7)$$

wherein E is the elasticity tensor, Ψ is the characteristic response in the microscale, and Y is unit cell domain.

Macroscopic Equation for the Cooling Stage is:

$$\int_\Omega E_{ijkl}^H \frac{\partial u_k}{\partial x_l}\frac{\partial v_i}{\partial x_j} d\Omega = \int_\Omega \beta_{ij}^H \frac{\partial v_i}{\partial x_j} d\Omega * \Delta T \quad (8)$$

wherein $E^H$ and $\beta^H$ are the homogenized elasticity matrix and the thermal stress tensor, respectively, and ΔT is the temperature difference.

The microscopic equations account for the characteristics deformation within the microstructures while the macroscopic equations account for the average deformation of the composite structure. The microscopic equations are solved and used as input information for solving the macroscopic equations within the FEA analysis.

It is recognized that the description of the various composite materials, e.g., glass-reinforced polypropylene, epoxy prepreg, PEEK staple fiber sheet and SMC, is not trivial and, therefore, different unit cells may be needed for different materials. Initially, the finite element modeling with the homogenization method will make use of the simple unit cell shown in FIG. 13. Based on the results of the initial modeling and comparing to the experimental results, new unit cells may be adopted in order to produce more accurate predictions.

Composite materials do not necessarily unload elastically as equation (8) assumes. This simplifying assumption will be modified as more experimental work is conducted. The actual shape of the unloading curve is determined from the experiments and incorporated into the final element model for hydroforming. It is then expected that the residual stress, springback, and the final shape of the part can be calculated accurately.

Hydroforming Fluid Pressure in the Fluid Chamber Cavity

The hydroforming process differs from the conventional stamping process because of the presence of the pressurized fluid during the forming operation. Two types of material failure are typically associated with the improper management of the fluid pressure. Fluid pressures that are too low result in wrinkling around the punch entrance area whereas rupture instabilities occur when the fluid pressure being used for the hydroforming process is too high. The role of the pressurized fluid is to constrain the motion of the blank and allow the punch to deform the blank. In order to curtail these instabilities, the fluid pressure must be determined a priori and then controlled as a function of the punch stroke for the duration of the hydroforming process.

A few researchers have studied this pressure requirement in the fluid chamber cavity during hydroforming. Baida et al. (Proc. Seventh International. Symp. on Plasticity and Its Curr. Appl. (PLASTICITY '99), January 5–13, Cancun, Mexico. Khan (ed.). pp. 293–296) modeled this hydroforming pressure for making thin metallic hemispherical components based on the presence of a hydrodynamic flow from the die entry radius to the extremity of the part being clamped. Their modeling work resulted in the following relationship for the pressure in the fluid chamber cavity:

$$p_{t+\delta t} = p_t + k\Delta \frac{V_t^{t+\delta t} + Q\delta t}{V_t} \quad (9)$$

wherein k is the compressibility of the fluid chamber cavity fluid, V is the volume of the fluid chamber cavity, ΔV is the volume displaced during the punch displacement and Q is the outflow under the blank holder. The subscript t and t+δt represent the time stepping control of the analysis.

Yossifon et al. (J. Eng. for Industry, 110: 146–152 (1988)) determined the hydroforming pressure within the fluid chamber cavity for making hemispherical components by relating the necessary pressure to the limit theorem of plasticity. This non-dimensional pressure relationship is illustrated in Equation 10:

$$\overline{P} = \frac{R_e^{n/2}\left[\int_{a\cos\alpha}^{(a+\rho)\cos\alpha}\frac{\left(\ln\frac{F}{r}\right)^n}{r}dr + \int_{(a+\rho)\cos\alpha}^{b}\frac{\left(\ln\frac{G}{r}\right)^n}{r}dr\right] + \frac{2\mu P_1 a}{\sigma_o l}\left(\frac{b}{a} - \frac{\rho}{a}\cos\alpha - \cos\alpha\right)}{\left(\frac{\rho}{a}\right)\left(1 + \frac{\rho}{2a}\right)} \quad (10)$$

wherein a, b, F, and G are the punch radius, the instantaneous outer radius of the flange, the initial radius of a material point, and a different initial radius of a material point, respectively; P and $P_1$ are the normalized pressure and the blank holding pressure, respectively; ρ is the curvature radius of the flange/cup transition; R is the ratio of the natural width strain to natural strain in uniaxial tension; μ is the coulomb friction coefficient, $\sigma_o$ is a material constant, n is the strain hardening coefficient, and r represents polar coordinates.

Lo et al. (J. Materials Processing Technol. 37: 225–239 (1993)) and Hsu et al. (J. Manufact. Sci. Eng. 118: 434–438 (1996)) expanded upon the above by changing the shape of the components being formed, however, these studies were conducted only on metal blanks.

The above equations enable the pressure relationship for the hydroforming of composite materials using the appropriate composite material properties and assumptions. Due to the varying properties of the composite materials, especially during and after hydroforming, a new pressure relationship is determined for various stages of the hydroforming process. Each time a pressure relationship is determined, it is used in the overall modeling process to provide an accurate finite element modeling of the composite hydroforming process. The above numerical analysis can be adapted to complex geometrical shapes.

The apparatus and method of the present invention can be used to manufacture shaped parts from sheet metal and composite blanks. In particular, the present invention provides for hydroforming of blanks comprising composite materials that include, but are not limited to, thermoplastics such as polyethylene, polystyrene, or nylon matrices with various types of reinforcement such as synthetic, cellulose, or carbon fibers; fiber-reinforced composites; epoxy prepegs; PEEK staple fiber sheets (DuPont); SMC (polyester or vinyl ester based materials); and glass reinforced polypropylene thermoplastics.

The following examples are intended to promote a further understanding of the present invention.

EXAMPLE 1

A working model of the apparatus of the present invention was built around an Interlaken ServoPress 75 (Interlaken, Inc. Minneapolis, Minn.). The Interlaken ServoPress 75 is a double-action press that allows the boundaries of the composite sheet to be clamped while the punch pushes the composite sheet into the fluid chamber cavity filled with supporting fluid. The press, which is powered with a hydraulic power supply, has a travel distance of 12 inches (30.48 cm) and can accommodate parts that are up to 16 inches (40.64 cm) in width. With a maximum clamping force of 333,600 Newton (N) and a maximum force of 257,984 N (75,000 pounds (34,000 kg) and 58,000 pounds (26,308 kg), respectively), the Interlaken ServoPress is very versatile and can be used for a plurality of experimental setups, e.g., punches of various particular configurations.

The Interlaken press was modified to include the apparatus of the present invention (FIGS. 4 and 5), which in this particular embodiment can be used for studying the hydroforming process on blanks comprising composite materials. The die was retrofitted with 4 ports, a first port for measuring the pressure within the fluid chamber, a second port for injecting fluid into the fluid chamber, a third port for measuring the temperature within the fluid chamber, and a fourth used for draining the fluid from the fluid chamber after the blank has been hydroformed. Attached to the fluid line was a regulator and controller, which were controlled by a computer, was used to accurately control the fluid pressure within the fluid chamber as the composite material was formed. If the pressure was too high, based on a user-defined algorithm, then the pressure in the system was reduced to the appropriate level. If the pressure was too low then the regulator pulled additional pressurized fluid from a pressurized reservoir that was in line with the rest of the system. A pressure intensifier was used to supply the necessary volume and pressure to the pressurized reservoir prior to the start of the hydroforming process.

In addition to the pressure controlling modifications, the system was also designed to take advantage of the heating that is required to form blanks comprising thermoplastic materials. Prior to entering the fluid chamber, the fluid was heated to a temperature of about 100° C. using a hot plate. Through injection of heated fluid, the natural cooling that typically occurs during this operation was eliminated, leading to a better formed blank. A second type of heating source that was used involved the use of a convection oven to bring the thermoplastic blank to the appropriate forming temperature, which in this case was about 100° C. The third and final heating source used for this manufacturing process involved heating the dies and tool prior to placing the blank in the experimental apparatus. This ensured that the blank was not prematurely cooled prior to the closing of the draw bead and injection of the heated fluid.

Using the above hydroforming apparatus, metal and composite sheets were formed.

EXAMPLE 2

To demonstrate operation of the present invention, an experimental set-up using the apparatus in Example 1 was designed to fabricate four-inch diameter hemispherical cups using blanks comprising a glass reinforced polypropylene thermoplastic material. The choice of this punch geometry was based upon its popularity in current metal and composite research (Lo et al., (1993); Gelin et al., (1994); Hsu et al., (1996); Hou (1997). By performing experiments using the hemispherical punch, the data collected can be readily compared against data that exists for operations such as composite sheet stamping, thermoforming, and even sheet metal hydroforming operations.

One of the unique opportunities associated with the choice of the hemispherical punch was that it allowed for the study of material tearing without wrinkling during this process. This allows for the optimization of the fluid pressure and heating schemes that can be maximized to allow for deeper drawing of the parts before rupturing.

Figure 14:
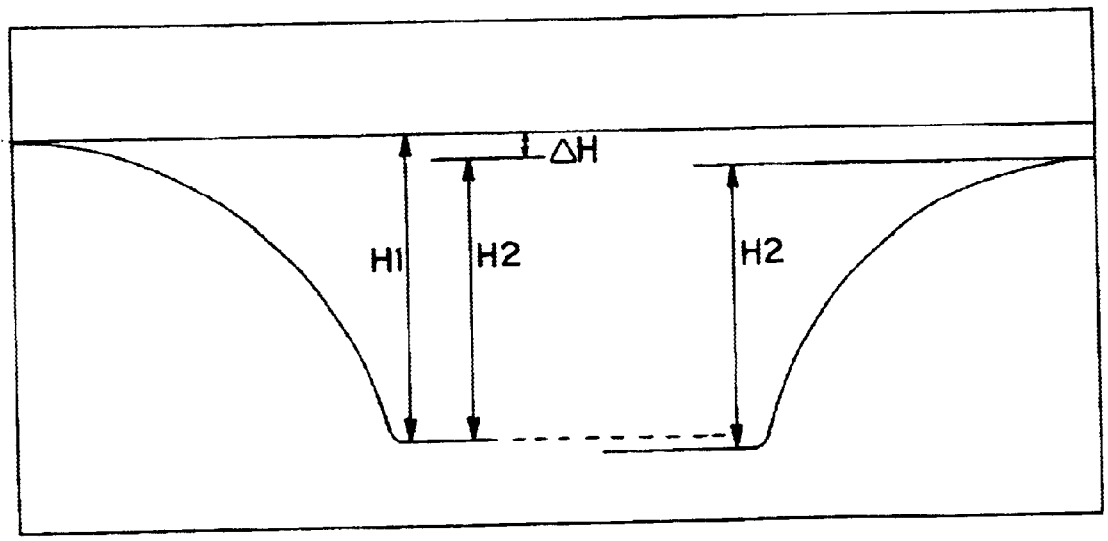
FIG. 14 shows a comparison of the blank formed with an applied hydrostatic force on the left to the blank formed without hydrostatic force.

FIG. 14 compares the parts that were formed from a blank comprising glass reinforced polypropylene thermoplastic material provided by Azdel, Inc. without a counteracting hydrostatic pressure and a part that was formed utilizing the applied hydrostatic pressure according to the present invention. The use of the hydrostatic pressure demonstrated appreciable increases in draw depth for the hemispherical part compared to the part formed without application of hydrostatic force. Stress and strain measurements were also taken during the hydroforming process. FIGS. 6 through 8 show stress strain data for particular composites that were hydroformed in the apparatus of the present invention. FIG. 11 shows that as the pressure is increased the amount of displacement achievable at a particular level of strain increases. FIG. 12 shows that increasing pressure enables greater displacement to be achieved at a particular Von Mises stress.

The setup required use of a draw bead to fix the borders of the blank material during the forming process. This forced the part to be formed from the blank through stretching of the blank only. In other setups, the draw bead is not used in which case the composite material is drawn in as it is formed. The fluid pressure within the fluid chamber is then used as a means of forcing the blank to conform to the surface of the punch. This allows for a deeper draw while still maintaining a uniform part thickness.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the Claims attached herein.

We claim:

1. A hydroforming apparatus for forming a blank with a fluid which is a liquid, the apparatus capable of being used in a punch press comprising:

a fluid chamber mountable to an upper shoe defining a cavity for providing pressurized fluid to the upper surface of the blank and having a downwardly facing blank mating surface;

a blank support mountable to a lower shoe having an upwardly facing blank binding surface for holding the blank with an opening therein which defines a cavity wherein a punch reciprocally located therein is capable of traveling upward through the opening into the fluid chamber;

the fluid chamber and blank support being adapted to receive and clamp the blank between the blank mating surface and the blank binding surface, and the fluid chamber includes a passageway means for transmitting pressurized fluid from a pressurized fluid means to the fluid chamber wherein the fluid forms the blank and a release means for removing the fluid; and heating means for heating the fluid to heat the blank during the forming.

2. The apparatus of claim 1 wherein the punch is enclosed within a punch chamber which has an opening for the punch to travel upwards into the fluid chamber, wherein the punch chamber includes a passageway means for transmitting pressurized fluid from a pressurized fluid means to the punch chamber wherein the fluid contacts the blank and a release means for removing the fluid.

3. The apparatus of claim 1 or 2 wherein the pressurized fluid means comprises a pressurized reservoir wherein the pressurized fluid is provided to the passageway means and wherein the pressure of the fluid is controlled by a pressure regulator.

4. The apparatus of claim 3 wherein the pressure of the pressurized fluid is monitored by a pressure transducer.

5. The apparatus of claim 3 wherein the pressure of the pressurized fluid is controlled by a computer.

6. The apparatus of claim 1 or 2 wherein a heating means heats fluid which is pressurized by the pressurized fluid means to the glass transition temperature and melting temperature of the blank.

7. The apparatus of claim 1 or 2 wherein the fluid is selected from the group consisting of silicon-based oil, petroleum-based oil, or a plant-based oil.

8. The apparatus of claim 1 or 2 wherein a membrane which is impervious to the pressurized fluid is positioned between the blank and the pressurized fluid to prevent the pressurized fluid from directly contacting the surface of the blank.

9. The apparatus of claim 1 or 2 wherein a heating means heats the blank support to a temperature between a glass transition temperature and melting temperature of the blank.

10. A hydroforming apparatus for forming a blank with a fluid which is a liquid, comprising:

a punch press comprising an upper shoe and a lower shoe with an opening therein which defines a cavity with a punch reciprocally located therein which is capable of traveling upward through the opening;

a fluid chamber mounted on the upper shoe defining a cavity for providing pressurized fluid to the upper surface of the blank and having a downwardly facing blank mating surface;

a blank support with an opening mounted on the lower shoe over the opening in the lower shoe and having an upwardly facing blank binding surface for holding the blank wherein the opening in the blank support enables the punch reciprocally located within the lower shoe to travel upward into the fluid chamber;

the fluid chamber and blank support being adapted to receive and clamp the blank between the blank mating surface and the blank binding surface, and the fluid chamber includes a passageway means for transmitting pressurized fluid from a pressurized fluid means to the fluid chamber wherein the fluid forms the blank and a release means for removing the fluid; and heating means for heating the fluid to heat the blank during the forming.

11. The apparatus of claim 10 wherein the punch is enclosed within a punch chamber which has an opening for the punch to travel upwards into the fluid chamber, wherein the punch chamber includes a passageway means for transmitting pressurized fluid from a pressurized fluid means to the punch chamber wherein the fluid contacts the blank and a release means for removing the fluid.

12. The apparatus of claim 10 or 11 wherein the pressurized fluid means comprises a pressurized reservoir wherein the pressurized fluid is provided to the passageway means and wherein the pressure of the fluid is controlled by a pressure regulator.

13. The apparatus of claim 12 wherein the pressure of the pressurized fluid is monitored by a pressure transducer.

14. The apparatus of claim 12 wherein the pressure of the pressurized fluid is controlled by a computer.

15. The apparatus of claim 10 or 11 wherein a heating means heats fluid which is pressurized by the pressurized fluid means to the glass transition temperature and melting temperature of the blank.

16. The apparatus of claim 10 or 11 wherein the fluid is selected from the group consisting of silicon-based oil, petroleum-based oil, or a plant-based oil.

17. The apparatus of claim 10 or 11 wherein a membrane which is impervious to the pressurized fluid is positioned between the blank and the pressurized fluid to prevent the pressurized fluid from directly contacting the surface of the blank.

18. The apparatus of claim 10 or 11 wherein a heating means heats the blank support to a temperature between the glass transition temperature and melting temperature of the blank.

19. A hydroforming apparatus for forming a blank with a fluid which is a liquid, the apparatus capable of being used in a press comprising:
   a fluid chamber mountable to a first shoe defining a cavity for providing pressurized fluid to an obverse surface of the blank and having a blank mating surface;
   a blank support mountable on a second shoe having a blank binding surface for holding a reverse surface of the blank with an opening therein which defines a cavity wherein a punch reciprocally located therein is capable of traveling through the opening into the fluid chamber;
   the fluid chamber and blank support being adapted to receive and clamp the blank between the blank mating surface and the blank binding surface, and the fluid chamber includes a passageway means for transmitting pressurized fluid from a pressurized fluid means to the fluid chamber wherein the fluid forms the blank and a release means for removing the fluid, and
   heating means for heating the blank during the forming.

20. The apparatus of claim 19 wherein the first shoe and the second shoe are mounted in a punch press.

21. The apparatus of claim 19 or 20 wherein the punch is enclosed within a punch chamber which has an opening for the punch to travel into the fluid chamber, wherein the punch chamber includes a passageway means for transmitting pressurized fluid from a pressurized fluid means to the punch chamber wherein the fluid contacts the blank and a release means for removing the fluid.

22. The apparatus of claim 19 or 20 wherein the pressurized fluid means comprises a pressurized reservoir wherein the pressurized fluid is provided to the passageway means and wherein the pressure of the fluid is controlled by a pressure regulator.

23. The apparatus of claim 22 wherein the pressure of the pressurized fluid is monitored by a pressure transducer.

24. The apparatus of claim 22 wherein the pressure of the pressurized fluid is controlled by a computer.

25. The apparatus of claim 19 or 20 wherein a heating means heats fluid which is pressurized by the pressurized fluid means to the glass transition temperature and melting temperature of the blank.

26. The apparatus of claim 19 or 20 wherein the fluid is selected from the group consisting of silicon-based oil, petroleum-based oil, or a plant-based oil.

27. The apparatus of claim 19 or 20 wherein a membrane which is impervious to the pressurized fluid is positioned between the blank and the pressurized fluid to prevent the pressurized fluid from directly contacting the surface of the blank.

28. The apparatus of claim 19 or 20 wherein a heating means heats the blank support to a temperature between the glass transition temperature and melting temperature of the blank.

29. A method for hydroforming a blank comprising:
   (a) providing an apparatus in a press comprising
      a fluid chamber mounted on a first shoe defining a cavity for providing pressurized fluid to an obverse surface of the blank and having a blank mating surface;
      a blank support mounted to a second shoe having a blank binding surface for holding a verse surface of the blank with an opening therein which defines a cavity with a punch reciprocally located therein which is capable of traveling through the opening into the fluid chamber;
      wherein the fluid chamber and blank support being adapted to receive and clamp the blank between the blank mating surface and the blank binding surface, and the fluid chamber includes a passageway means for transmitting pressurized fluid from a pressurized fluid means to the fluid chamber wherein the fluid forms the blank and a release means for removing the fluid; and
      heating means for heating the blank during the forming;
   (b) positioning a blank on the blank support between the blank mating surface and the blank binding surface;
   (c) forming a seal between the blank and the fluid chamber and the punch cavity by moving the fluid chamber toward the punch chamber until the blank is firmly clamped between the blank mating surface and the blank binding surface with heating of the blank by the heating means;
   (d) providing a fluid to the fluid chamber under a pressure sufficient to conform the blank to the shape of the punch as the punch moves into the cavity of the fluid chamber;
   (e) moving the punch into the cavity of the fluid chamber to form the blank to the shape of the punch;
   (f) removing the fluid through the release means;
   (g) withdrawing the punch into the punch cavity; and
   (h) removing a formed blank from the apparatus.

30. The method of claim 29 wherein the punch is enclosed within a punch chamber which has an opening for the punch to travel into the fluid chamber, wherein the punch chamber includes a passageway means for transmitting pressurized fluid from a pressurized fluid means to the punch chamber wherein the fluid contacts the blank and a release means for removing the fluid and wherein the pressurized fluid pressure is at a pressure sufficient to maintain equal pressure on both sides of the blank during the blank forming.

31. The method of claim 29 or 30 wherein the pressurized fluid means comprises a pressurized reservoir wherein the pressurized fluid is provided to the passageway means and wherein the pressure of the fluid is controlled by a pressure regulator.

32. The method of claim 31 wherein the pressure of the pressurized fluid is monitored by a pressure transducer.

33. The method of claim 31 wherein the pressure of the pressurized fluid is controlled by a computer.

34. The method of claim 29 wherein the pressurized fluid is provided at a temperature above the glass transition temperature of the blank.

35. The method of claim 29 wherein the fluid is selected from the group consisting of silicon-based oil, petroleum-based oil, or a plant-based oil.

36. The method of claim 29 or 30 wherein a membrane which is impervious to the pressurized fluid is positioned between the blank and the pressurized fluid to prevent the pressurized fluid from directly contacting the surface of the blank.

37. The method of claim 29 or 30 wherein during the forming of the blank the fluid pressure is maintained at a constant pressure.

38. The method of claim 29 or 30 wherein during the forming of the blank the fluid pressure is varied over time.

39. The method of claim 29 or 30 wherein the blank is heated to a temperature between its glass transition temperature and its melting temperature.

40. The method of claim 39 wherein an infra-red heater is used to heat the blank.

41. The method of claim 29 or 30 wherein the blank support is heated to a temperature between the glass transition temperature and melting temperature of the blank.

42. The method of claim 29 or 30 wherein the blank is a metal or a composite.

43. The method of claim 42 wherein the blank is a composite which is brittle at or below room temperature.

44. The method of claim 29 wherein the pressurized fluid is at a pressure sufficient to conform the blank to the punch as the punch deforms the blank.

45. A hydroforming apparatus for forming a composite blank, comprising:
 a fluid chamber mountable to a first shoe defining a cavity for providing pressurized fluid to an obverse surface of the blank and having a blank mating surface;
 a blank support mounted to a second shoe having a blank binding surface for holding a reverse surface of the blank with an opening therein which defines a cavity wherein a punch reciprocally located therein is capable of traveling through the opening into the fluid chamber;
 heating means for heating the blank during the forming;
 a recycle means to introduce heated or cooled fluid into the fluid chamber to cure the composite blank which has been formed; and
 the fluid chamber and blank support being adapted to receive and clamp a flexible blank between the blank mating surface and the blank binding surface, and the fluid chamber includes a passageway means for transmitting pressurized fluid from a pressurized fluid means to the fluid chamber wherein the fluid forms the blank and a release means for removing the fluid.

46. The apparatus of claim 45 wherein the punch is enclosed within a punch chamber which has an opening for the punch to travel into the fluid chamber, wherein the punch chamber includes a passageway means for transmitting pressurized fluid from a pressurized fluid means to the punch chamber wherein the fluid contacts the blank and a release means for removing the fluid.

47. The apparatus of claim 45 or 46 wherein the pressurized fluid means comprises a pressurized reservoir wherein the pressurized fluid is provided to the passageway means and wherein the pressure of the fluid is controlled by a pressure regulator.

48. The apparatus of claim 47 wherein the pressure of the pressurized fluid is monitored by a pressure transducer.

49. The apparatus of claim 48 wherein the pressure of the pressurized fluid is controlled by a computer.

50. The apparatus of claim 45 or 46 wherein a heating means heats fluid which is pressurized by the pressurized fluid means to a temperature between the glass transition temperature and melting temperature of the blank.

51. The apparatus of claim 45 or 46 wherein the fluid is selected from the group consisting of silicon-based oil, petroleum-based oil, or a plant-based oil.

52. The apparatus of claim 45 or 46 wherein a membrane which is impervious to the pressurized fluid is positioned between the blank and the pressurized fluid to prevent the pressurized fluid from directly contacting the surface of the blank.

53. The apparatus of claim 45 or 46 wherein a heating means heats the blank support to a temperature between the glass transition temperature and melting temperature of the blank.

54. A method for hydroforming a flexible composite blank comprising:
 (a) providing an apparatus mounted in a conventional press comprising
  a fluid chamber mounted on a first shoe defining a cavity for providing pressurized fluid to an obverse surface of the blank and having a blank mating surface;
  a blank support mounted to a second shoe having a blank binding surface for holding a verse surface of the blank with an opening therein which defines a cavity with a punch reciprocally located therein which is capable of traveling through the opening into the fluid chamber; and
  wherein the fluid chamber and blank support being adapted to receive and clamp the blank between the blank mating surface and the blank binding surface, and the fluid chamber includes a passageway means for transmitting pressurized fluid from a pressurized fluid means to the fluid chamber wherein the fluid forms the blank and a release means for removing the fluid;
 (b) positioning a blank on the blank support between the blank mating surface and the blank binding surface;
 (c) forming a seal between the blank and the fluid chamber and the punch cavity by moving the fluid chamber toward the punch chamber until the blank is firmly clamped between the blank mating surface and the blank binding surface;
 (d) providing a fluid to the fluid chamber under a pressure sufficient to conform the blank to the shape of the punch as the punch moves into the cavity of the fluid chamber;
 (e) moving the punch into the cavity of the fluid chamber to form the blank to the shape of the punch;
 (f) removing the fluid through the release means;
 (g) withdrawing the punch into the punch cavity;
 (h) providing heated or cooled fluid to the fluid chamber through a recycle means to cure the composite comprising the blank; and
 (i) removing a formed blank from the apparatus.

55. The method of claim 54 wherein the punch is enclosed within a punch chamber which has an opening for the punch to travel into the fluid chamber, wherein the punch chamber includes a passageway means for transmitting pressurized fluid from a pressurized fluid means to the punch chamber wherein the fluid contacts the blank and a release means for removing the fluid and wherein the pressurized fluid pressure is at a pressure sufficient to maintain equal pressure on both sides of the blank during the blank forming.

56. The method of claim 54 or 55 wherein the pressurized fluid means comprises a pressurized reservoir wherein the pressurized fluid is provided to the passageway means and wherein the pressure of the fluid is controlled by a pressure regulator.

57. The method of claim 56 wherein the pressure of the pressurized fluid is monitored by a pressure transducer.

58. The method of claim 56 wherein the pressure of the pressurized fluid is controlled by a computer.

59. The method of claim 54 wherein the pressurized fluid is provided at a temperature above the glass transition temperature of the blank.

60. The method of claim 54 wherein the fluid is selected from the group consisting of silicon-based oil, petroleum-based oil, or a plant-based oil.

61. The method of claim 54 or 55 wherein a membrane which is impervious to the pressurized fluid is positioned between the blank and the pressurized fluid to prevent the pressurized fluid from directly contacting the surface of the blank.

62. The method of claim 54 or 55 wherein during the forming of the blank the fluid pressure is maintained at a constant pressure.

63. The method of claim 54 or 55 wherein during the forming of the blank the fluid pressure is varied over time.

64. The method of claim 54 or 55 wherein the blank is heated to a temperature between its glass transition temperature and its melting temperature.

65. The method of claim 64 wherein an infra-red heater is used to heat the blank.

66. The method of claim 54 or 55 wherein the blank support is heated to a temperature between the glass transition temperature and melting temperature of the blank.

67. The method of claim 54 or 55 wherein the blank is a metal or a composite.

68. The method of claim 67 wherein the blank is a composite which is brittle at or below room temperature.

69. The method of claim 54 wherein the pressurized fluid is at a pressure sufficient to conform the blank to the punch as the punch deforms the blank.

70. A hydroforming apparatus for forming a blank with a fluid which is a liquid comprising:

a first shoe defining a first cavity and having a blank mating surface;

a blank support on a second shoe having a blank binding surface for holding the blank with an opening therein which defines a second cavity for providing a fluid in the cavity wherein a punch reciprocally located in the second cavity with the fluid is capable of traveling through the opening into the cavity in the first shoe; and the first shoe and blank support being adapted to receive and clamp the blank between the blank mating surface and the blank binding surface, and the second cavity includes a passageway means for transmitting the fluid under pressure from a pressurized fluid means to the second cavity wherein the fluid contacts the blank and a release means for removing the fluid.

71. The apparatus of claim 70 wherein the cavity of the first shoe in addition is a fluid chamber.

72. A hydroforming apparatus for forming a blank with a fluid which is a liquid, the apparatus capable of being used in a press comprising:

a first fluid chamber mountable to a first shoe defining a first cavity for providing pressurized fluid to an obverse surface of the blank and having a blank mating surface;

a blank support mountable on a second shoe having a blank binding surface for holding a reverse surface of the blank with an opening therein which defines a second cavity as a second fluid chamber and wherein a punch reciprocally located therein is capable of traveling through the opening into the first fluid chamber; and the first fluid chamber and blank support being adapted to receive and clamp the blank between the blank mating surface and the blank binding surface, and the first and second fluid chambers include a passageway means for transmitting pressurized fluid from a pressurized fluid means to the fluid chamber wherein the fluid forms the blank and a release means for removing the fluid.

73. The apparatus of claim 72 wherein the pressurized fluid means comprises a pressurized reservoir wherein the pressurized fluid is provided to the passageway means and wherein the pressure of the fluid is controlled by a pressure regulator.

74. The apparatus of claim 73 wherein the pressure of the pressurized fluid is monitored by a pressure transducer.

75. The apparatus of claim 73 wherein the pressure of the pressurized fluid is controlled by a computer.

76. The apparatus of claim 72 wherein a heating means heats fluid which is pressurized by the pressurized fluid means to the glass transition temperature and melting temperature of the blank.

77. The apparatus of claim 73 wherein the fluid is selected from the group consisting of silicon-based oil, petroleum-based oil, or a plant-based oil.

78. The apparatus of claim 73 wherein a membrane which is impervious to the pressurized fluid is positioned between the blank and the pressurized fluid to prevent the pressurized fluid from directly contacting the surface of the blank.

* * * * *

UNITED STATES PATENT AND TRADEMARK OFFICE
CERTIFICATE OF CORRECTION

PATENT NO. : 6,631,630 B1 Page 1 of 1
DATED : October 14, 2003
INVENTOR(S) : Farhang Pourboghrat, Michael A. Zampaloni and Andre Benard It is certified that error appears in the above-identified patent and that said Letters Patent is hereby corrected as shown below:

Column 10,
Line 38, "heated an appropriate" should be -- heated to an appropriate --.

Column 12,
Line 24, "during" after "pressure" and before "that" should be deleted.
Line 34, "desirable cure" should be -- desirable to cure --.

Column 16,
Line 61, "microscopic filed" should be -- microscopic field --.

Column 17,
Line 27, "$(E_m-E^T_{K1})$" should be -- $(E_{k1}-E^T_{K1})$ --
Line 50, "w and τ T" should be -- w and τ --.

Line 61, equation 6, " $=\int_\Omega \dot{q}_n d\Gamma$ " should be -- $=\int_\Gamma \dot{q}_n d\Gamma$ --.

Signed and Sealed this

Second Day of March, 2004

JON W. DUDAS
*Acting Director of the United States Patent and Trademark Office*